United States Patent
Bier et al.

(10) Patent No.: US 9,721,039 B2
(45) Date of Patent: Aug. 1, 2017

(54) GENERATING A RELATIONSHIP VISUALIZATION FOR NONHOMOGENEOUS ENTITIES

(75) Inventors: Eric A. Bier, Palo Alto, CA (US); Oliver Brdiczka, Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 539 days.

(21) Appl. No.: 13/328,989

(22) Filed: Dec. 16, 2011

(65) Prior Publication Data

US 2013/0155068 A1  Jun. 20, 2013

(51) Int. Cl.
| | |
|---|---|
| G06T 11/20 | (2006.01) |
| G06F 17/30 | (2006.01) |
| G06Q 10/10 | (2012.01) |
| G06Q 10/06 | (2012.01) |

(52) U.S. Cl.
CPC ....... *G06F 17/30946* (2013.01); *G06Q 10/06* (2013.01); *G06Q 10/10* (2013.01)

(58) Field of Classification Search
CPC ......... G06F 17/30946; G06F 17/30716; G06F 17/30067; G06F 17/30286; G06F 17/30595; G06T 11/206; G06Q 10/10; G06Q 10/06
See application file for complete search history.

(56) References Cited

U.S. PATENT DOCUMENTS

| | | | | |
|---|---|---|---|---|
| 5,325,298 | A | * | 6/1994 | Gallant .............................. 704/9 |
| 5,619,632 | A | * | 4/1997 | Lamping et al. ............. 345/441 |
| 5,619,709 | A | * | 4/1997 | Caid et al. ..................... 715/209 |
| 5,794,178 | A | * | 8/1998 | Caid et al. ........................ 704/9 |
| 5,808,615 | A | * | 9/1998 | Hill et al. ..................... 715/853 |
| 5,870,564 | A | * | 2/1999 | Jensen et al. ................. 709/241 |

(Continued)

OTHER PUBLICATIONS

Laclavil, Michal et al., "Use of E-mail Social Networks for Enterprise Benefit", Web Intelligence and Intelligent Agent Technology, 2010 IEEE/WIC/ACM International Conference, Aug. 31, 2010, pp. 67-70, XP031784982.

(Continued)

*Primary Examiner* — Devona Faulk
*Assistant Examiner* — Charles L Beard
(74) *Attorney, Agent, or Firm* — Shun Yao; Park, Vaughan, Fleming & Dowler LLP

(57) ABSTRACT

A relationship visualization system displays contextual information for a relationship between two entities of a document management system, such as for a user and a document. The system can receive a request for a relationship visualization from a user, such that the request indicates the user and a document. Then, the system determines, from a multipartite graph, a set of relationship paths coupling entity nodes that correspond to the user and the document. A relationship path can include one or more entity nodes indicating contextual information for the relationship between the user and the document. Then, the system selects a first group of entity nodes from the set of relationship paths to represent the relationship between the user and the document. The system then provides a relationship visualization that displays contextual information from the first group of entity nodes to illustrate the relationship between the user and the document.

20 Claims, 11 Drawing Sheets

(56) References Cited

U.S. PATENT DOCUMENTS

| | | | | |
|---|---|---|---|---|
| 5,995,114 A * | 11/1999 | Wegman | G06T 11/206 | 345/440 |
| 6,144,962 A * | 11/2000 | Weinberg | G06F 11/32 | |
| 6,189,002 B1 * | 2/2001 | Roitblat | | |
| 6,236,768 B1 * | 5/2001 | Rhodes et al. | 382/306 | |
| 6,509,898 B2 | 1/2003 | Chi et al. | 345/440 | |
| 6,604,114 B1 | 8/2003 | Toong | G06F 17/30014 | |
| 6,711,585 B1 | 3/2004 | Copperman et al. | | |
| 6,760,714 B1 | 7/2004 | Caid et al. | 706/14 | |
| 6,897,866 B1 | 5/2005 | Hetzler et al. | 345/440 | |
| 6,944,830 B2 | 9/2005 | Card | G06F 17/30873 | 345/440 |
| 6,985,898 B1 * | 1/2006 | Ripley et al. | | |
| 7,028,050 B1 | 4/2006 | Rose | | |
| 7,203,701 B1 | 4/2007 | Packebush et al. | | |
| 7,228,492 B1 | 6/2007 | Graham | 715/234 | |
| 7,251,637 B1 | 7/2007 | Caid et al. | 706/15 | |
| 7,305,389 B2 * | 12/2007 | Zeng et al. | 707/721 | |
| 7,480,712 B2 * | 1/2009 | Moy | G06Q 10/10 | 709/220 |
| 7,496,582 B2 | 2/2009 | Farnham | G06Q 10/10 | |
| 7,565,627 B2 | 7/2009 | Brill et al. | 715/854 | |
| 7,603,349 B1 * | 10/2009 | Kraft et al. | | |
| 7,668,787 B2 | 2/2010 | Bier | G06F 17/30716 | 706/11 |
| 7,702,685 B2 | 4/2010 | Shrufi | G06F 17/30421 | 707/760 |
| 7,716,140 B1 | 5/2010 | Nielsen | G06F 21/6245 | 705/319 |
| 7,765,259 B2 | 7/2010 | MacVarish | G06Q 10/10 | 709/204 |
| 7,840,604 B2 | 11/2010 | Zhu | G06F 17/30613 | 705/35 |
| 7,856,411 B2 | 12/2010 | Darr | G06Q 10/10 | 706/45 |
| 7,882,105 B2 | 2/2011 | Laugier | G06F 17/30864 | 707/726 |
| 7,882,191 B2 | 2/2011 | Sood | G06Q 10/10 | 709/206 |
| 7,933,843 B1 | 4/2011 | Von Groll | G06Q 10/10 | 704/9 |
| 7,953,732 B2 | 5/2011 | Frank et al. | 707/724 | |
| 7,953,752 B2 | 5/2011 | Soules et al. | 707/771 | |
| 7,987,169 B2 | 7/2011 | Epstein | 707/706 | |
| 8,001,157 B2 | 8/2011 | Bier | G06F 17/30716 | 704/9 |
| 8,019,875 B1 | 9/2011 | Nielsen | G06Q 10/06 | 709/226 |
| 8,296,666 B2 | 10/2012 | Wright et al. | 715/764 | |
| 8,312,385 B2 | 11/2012 | Bier | G06Q 10/10 | 715/700 |
| 8,335,989 B2 | 12/2012 | Barraclough | G06Q 10/10 | 715/733 |
| 8,341,540 B1 | 12/2012 | Haynes et al. | 715/772 | |
| 8,346,864 B1 | 1/2013 | Amidon | H04L 65/1069 | 709/204 |
| 8,347,237 B2 | 1/2013 | Bier et al. | 715/853 | |
| 8,428,935 B1 | 4/2013 | Waelti et al. | 704/10 | |
| 8,484,016 B2 | 7/2013 | Brockett | G06F 17/2775 | 704/2 |
| 8,626,835 B1 | 1/2014 | Gyongyi | G06Q 10/10 | 709/204 |
| 8,631,021 B2 | 1/2014 | Palmer et al. | 707/754 | |
| 8,682,764 B2 | 3/2014 | Love | G06Q 10/10 | 705/35 |
| 8,791,948 B2 | 7/2014 | Patil | G06Q 10/00 | 345/440 |
| 8,793,317 B2 | 7/2014 | Bellomo | G06Q 10/10 | 709/200 |
| 8,799,323 B2 | 8/2014 | Nevin, III | 707/797 | |
| 8,838,597 B1 | 9/2014 | Gottumukkala | G06F 17/30946 | 707/736 |
| 8,897,484 B1 * | 11/2014 | Fredinburg | G11B 20/00855 | 382/100 |
| 9,015,597 B2 * | 4/2015 | Pearson | G06Q 10/10 | 715/743 |
| 9,031,972 B2 * | 5/2015 | Yin | G06Q 10/10 | 707/758 |
| 9,064,002 B1 * | 6/2015 | Gyongyi | G06Q 10/10 | |
| 9,195,962 B2 * | 11/2015 | Topham | G06Q 10/10 | |
| 9,324,056 B2 * | 4/2016 | Soshin | G06Q 10/10 | |
| 9,367,823 B1 * | 6/2016 | Mihalik | G06F 17/3053 | |
| 9,501,761 B2 * | 11/2016 | Arbel | G06F 21/6218 | |
| 9,531,793 B2 * | 12/2016 | Shah | G06F 3/0481 | |
| 9,547,876 B2 * | 1/2017 | McCormick | G06Q 10/10 | |
| 2002/0019827 A1 * | 2/2002 | Shiman et al. | 707/200 | |
| 2002/0107827 A1 | 8/2002 | Benitez-Jimenez et al. | 706/59 | |
| 2002/0169737 A1 | 11/2002 | Armstrong et al. | 706/59 | |
| 2003/0065650 A1 * | 4/2003 | Annand et al. | 707/3 | |
| 2003/0227487 A1 | 12/2003 | Hugh | 345/777 | |
| 2004/0024739 A1 | 2/2004 | Copperman et al. | 707/1 | |
| 2004/0150644 A1 | 8/2004 | Kincaid et al. | 345/440 | |
| 2005/0075974 A1 * | 4/2005 | Turgeon | G06Q 40/02 | 705/39 |
| 2005/0097188 A1 * | 5/2005 | Fish | 709/217 | |
| 2005/0104885 A1 | 5/2005 | Jager et al. | 345/440 | |
| 2005/0203924 A1 | 9/2005 | Rosenberg | 707/100 | |
| 2005/0278307 A1 * | 12/2005 | Battagin et al. | 707/3 | |
| 2005/0289103 A1 | 12/2005 | Bier | 707/1 | |
| 2005/0289456 A1 | 12/2005 | Bier | 715/513 | |
| 2006/0004789 A1 | 1/2006 | Lunt | H04L 63/102 | |
| 2006/0080321 A1 | 4/2006 | Horn et al. | 707/10 | |
| 2006/0116994 A1 * | 6/2006 | Jonker et al. | 707/3 | |
| 2006/0176306 A1 * | 8/2006 | Nagaraj et al. | 345/440 | |
| 2007/0033221 A1 | 2/2007 | Copperman et al. | 707/103 R | |
| 2007/0112793 A1 | 5/2007 | Florescu et al. | 707/100 | |
| 2007/0168856 A1 | 7/2007 | Berkner et al. | 715/517 | |
| 2007/0226248 A1 * | 9/2007 | Darr | G06Q 10/10 | |
| 2007/0244892 A1 | 10/2007 | Narancic | 707/7 | |
| 2007/0299547 A1 * | 12/2007 | Bier | G06F 17/30716 | 700/17 |
| 2007/0299872 A1 * | 12/2007 | Bier | G06F 17/30716 | |
| 2008/0091672 A1 | 4/2008 | Gloor | 707/5 | |
| 2008/0133483 A1 * | 6/2008 | Bayley et al. | 707/3 | |
| 2008/0174603 A1 * | 7/2008 | Brass | G06T 11/206 | 345/501 |
| 2008/0177693 A1 | 7/2008 | Nakamura | G06F 17/30064 | |
| 2008/0183695 A1 | 7/2008 | Jadhav | 707/5 | |
| 2008/0243811 A1 * | 10/2008 | He et al. | 707/5 | |
| 2008/0270946 A1 | 10/2008 | Risch et al. | 715/848 | |
| 2008/0281801 A1 | 11/2008 | Larson | G06F 17/30595 | |
| 2008/0294672 A1 * | 11/2008 | Dieberger et al. | 707/102 | |
| 2008/0306959 A1 | 12/2008 | Spivack et al. | 707/9 | |
| 2009/0027392 A1 | 1/2009 | Jadhav et al. | 345/440 | |
| 2009/0164912 A1 | 6/2009 | Barber et al. | 715/751 | |
| 2009/0228830 A1 | 9/2009 | Herz | G06F 17/30572 | 715/808 |
| 2009/0265106 A1 * | 10/2009 | Bearman | G06Q 10/00 | 701/300 |
| 2009/0299990 A1 * | 12/2009 | Setlur et al. | 707/5 | |
| 2010/0073377 A1 | 3/2010 | Cai et al. | 345/440 | |
| 2010/0106752 A1 | 4/2010 | Eckardt et al. | 707/805 | |
| 2010/0115003 A1 | 5/2010 | Soules | G06F 17/30994 | 707/822 |
| 2010/0138426 A1 | 6/2010 | Nakayama et al. | 707/741 | |
| 2010/0161369 A1 | 6/2010 | Farrell | G06Q 50/01 | 705/319 |
| 2010/0169788 A1 * | 7/2010 | Khurana et al. | 715/738 | |
| 2010/0257184 A1 | 10/2010 | Uy | 707/748 | |
| 2010/0257454 A1 | 10/2010 | Lee et al. | 715/738 | |
| 2010/0284309 A1 | 11/2010 | Allan et al. | 370/256 | |
| 2010/0317950 A1 | 12/2010 | Galley et al. | 600/365 | |
| 2011/0078188 A1 | 3/2011 | Li | G06Q 30/02 | 707/776 |
| 2011/0184983 A1 * | 7/2011 | Kwantes | G06F 17/30716 | 707/776 |
| 2011/0231382 A1 | 9/2011 | Xu | G06F 17/278 | 707/706 |
| 2011/0246483 A1 * | 10/2011 | Darr | G06Q 10/10 | 707/748 |

(56) References Cited

U.S. PATENT DOCUMENTS

| | | | |
|---|---|---|---|
| 2011/0258193 A1* | 10/2011 | Brdiczka et al. | 707/739 |
| 2011/0271230 A1* | 11/2011 | Harris et al. | 715/810 |
| 2011/0271232 A1* | 11/2011 | Crochet et al. | 715/810 |
| 2011/0280640 A1* | 11/2011 | Gnanasambandam et al. | 400/76 |
| 2011/0289207 A1* | 11/2011 | Liu et al. | 709/224 |
| 2011/0295589 A1* | 12/2011 | Brockett | G06F 17/2775 704/4 |
| 2012/0005239 A1* | 1/2012 | Nevin, III | 707/798 |
| 2012/0014393 A1* | 1/2012 | Rayrole | 370/461 |
| 2012/0072475 A1* | 3/2012 | Morrison et al. | 708/200 |
| 2012/0117516 A1* | 5/2012 | Guinness | 715/853 |
| 2012/0144317 A1* | 6/2012 | Balasubramanian | H04L 67/24 715/751 |
| 2012/0179752 A1* | 7/2012 | Mosley | G06Q 10/10 709/204 |
| 2012/0246173 A1* | 9/2012 | Wittmer et al. | 707/749 |
| 2012/0278127 A1* | 11/2012 | Kirakosyan et al. | 705/7.29 |
| 2012/0290572 A1* | 11/2012 | Hayashi | G06F 19/3456 707/736 |
| 2012/0290652 A1* | 11/2012 | Boskovic | G06Q 50/30 709/204 |
| 2012/0330853 A1* | 12/2012 | Forbes | G06O 30/02 705/319 |
| 2013/0031190 A1* | 1/2013 | Chan | G06Q 50/01 709/206 |
| 2013/0275429 A1* | 10/2013 | York | G06F 17/30029 707/737 |
| 2014/0214945 A1* | 7/2014 | Zhang | H04L 67/306 709/204 |
| 2015/0163353 A1* | 6/2015 | Nezarati | H04M 3/42042 379/142.04 |
| 2015/0242424 A1* | 8/2015 | Godsey | G06F 17/3089 707/689 |
| 2016/0055660 A1* | 2/2016 | Yamane | H04L 45/124 345/440 |
| 2016/0371793 A1* | 12/2016 | Anand | H04L 65/403 |
| 2017/0091644 A1* | 3/2017 | Chung | G06N 7/005 |

OTHER PUBLICATIONS

Baeza-Yates, R. et. al., "A Model for Automatic Generation of Multi-Partite Graphs from Arbitrary Data", Web-Age Information Management, 11th International Conference, WAIM 2010, Jul. 15, 2010, pp. 49-60, XP002694615.

Anderson, John R. et al., "Spread of Activation", Journal of Experimental Psychology: Learning, Memory, and Cognition, 1984, vol. 10, No. 4, pp. 791-798.

Gyllstrom, Karl et. al., "Seeing is retrieving: Building information context from what the user sees", Jan. 2008, pp. 189-198.

Nadeau, David et al., "A Survey of Named Entity Recognition and Classification", 2006, pp. 1-20.

Eppstein, David "Finding the k Shortest Paths", 1994, pp. 1-22.

Dragunov, Anton N. et al., "TaskTracer: A Desktop Environment to Support Multi-Tasking Knowledge Workers", 2005, pp. 75-82.

Brdiczka, Oliver "From Documents to Tasks: Deriving User Tasks from Document Usage Patterns", 2010, Entire document.

Rattenbury, Tye et al., "CAAD: An Automatic Task Support System", 2007, Entire document.

Voida, Stephen et al., "'It Feels Better Than Filing': Everyday Work Experiences in an Activity-Based Computing System", 2009, pp. 259-268.

Soules, Craig A.N. et al., "Connections: Using Context to Enhance File Search", 2005, Entire document.

* cited by examiner

GENERATING A RELATIONSHIP VISUALIZATION FOR NONHOMOGENEOUS ENTITIES

BACKGROUND

Field

This disclosure is generally related to a document management system. More specifically, this disclosure is related to generating a relationship visualization that displays how two information entities are related.

Related Art

Some file systems or document management systems include a search mechanism to locate documents that mention a search phrase within the document or its attributes. The generated search results may indicate the title and file path for the matching documents, and may sort the matching documents based on a certain file attribute.

Unfortunately, these search mechanisms can generate significantly large search results that can easily overwhelm the user. To make matters worse, the type of information provided in the search results often does not help the user in remembering or otherwise identifying which document in the search results includes the information he is searching for. The visualization for the search results is typically designed to display file attributes for the document (e.g., a file location and/or file type), but it does not display other valuable information related to the document that can help the user make a decision.

Further, these search mechanisms may use a pattern-matching operation to find a document that mentions a desired phrase. However, the user cannot use these search mechanisms to find a phrase that he does not remember, such as a person's name or telephone number that the user does not remember. If the user desires to find a person's telephone number, the user may need to perform a search for that person's name, and hope that he can find the telephone number in one of the documents in the search results. If the user does not remember the person's name, the user may find it even more challenging to conduct his search.

Therefore, the search and visualization capabilities of a typical document management system do not always guide the user directly to the information he is searching for. In some instances, the user may need to open several documents in the search results, one after another, to view their contents until the user finds the desired document or information.

SUMMARY

One embodiment provides a visualization system that displays a relationship visualization, which illustrates a relationship between a user and a document. The visualization system can receive a request for a relationship visualization from a user, such that the request indicates the user and a document. Then, the visualization system determines, from a multipartite graph, a set of relationship paths coupling entity nodes for the user and the document. A relationship path includes one or more entity nodes indicating contextual information for a relationship between the user and the document. Then, the visualization system selects a first group of entity nodes from the set of relationship paths to represent the relationship between the user and the document. The visualization system then provides a relationship visualization that displays contextual information from the first group of entity nodes to illustrate the relationship between the user and the document.

In some embodiments, the request can also indicate a date range for the relationship visualization. Further, the visualization system can determine a relationship path that corresponds to the indicated date range by selecting a date-range entity node whose corresponding date range overlaps with the indicated date range, and determining a relationship path of the multipartite graph that traverses the selected date-range entity node.

In some variations, the system generates a date-centric relationship visualization by determining a visualization position for each entity node based on a corresponding date and/or time, and generating a visualization that displays contextual information for these entity nodes at their corresponding visualization positions. The visualization system can determine a visualization position by determining a position along a first axis for the entity node based on an entity type for the entity node, and determining a position along a second axis for the entity node based on a date associated with the entity node.

In some embodiments, the system can determine a set of relationship paths by selecting one or more shortest paths between the user's entity node and the document's entity node. The system can compute a path's length by determining a weighted value for each entity node and each edge in the multipartite graph, and then for each edge in the path, adding an inverse of the edge's weighted value to the path's length. Further, the system can adjust the path's length by subtracting, from the path's length, a weighted value for each entity node in the path.

In some embodiments, the system selects a group of entity nodes by selecting, from the relationship paths, an entity node based on a corresponding significance score.

The system can compute a significance score for an entity node by first computing an initial flow through the relationship paths from the user's entity node to the document's entity node. Then, the system determines a reduced flow associated with the entity node by computing a flow through the relationship paths without traversing the entity node. The system then assigns a significance score to the entity node based on a difference between the initial flow and the reduced flow.

In some embodiments, the visualization system can generate a relationship visualization between any two entity nodes of the multipartite graph. For example, the system can receive a request for a relationship visualization indicating a document and a distal entity. The system can then determine a set of relationship paths from the multipartite graph that couple entity nodes for the document and the distal entity. Next, the system selects a group of entity nodes from the set of relationship paths, and provides a relationship visualization that displays contextual information from this group of entity nodes to illustrate the relationship between the document and the distal entity.

In some embodiments, an entity node of the multipartite graph corresponds to an entity type selected from the group consisting of: a person; a document; a project; a topic; a date range; a company; an address; and a phone number.

BRIEF DESCRIPTION OF THE FIGURES

In the figures, like reference numerals refer to the same figure elements.

DETAILED DESCRIPTION

Figure 1:
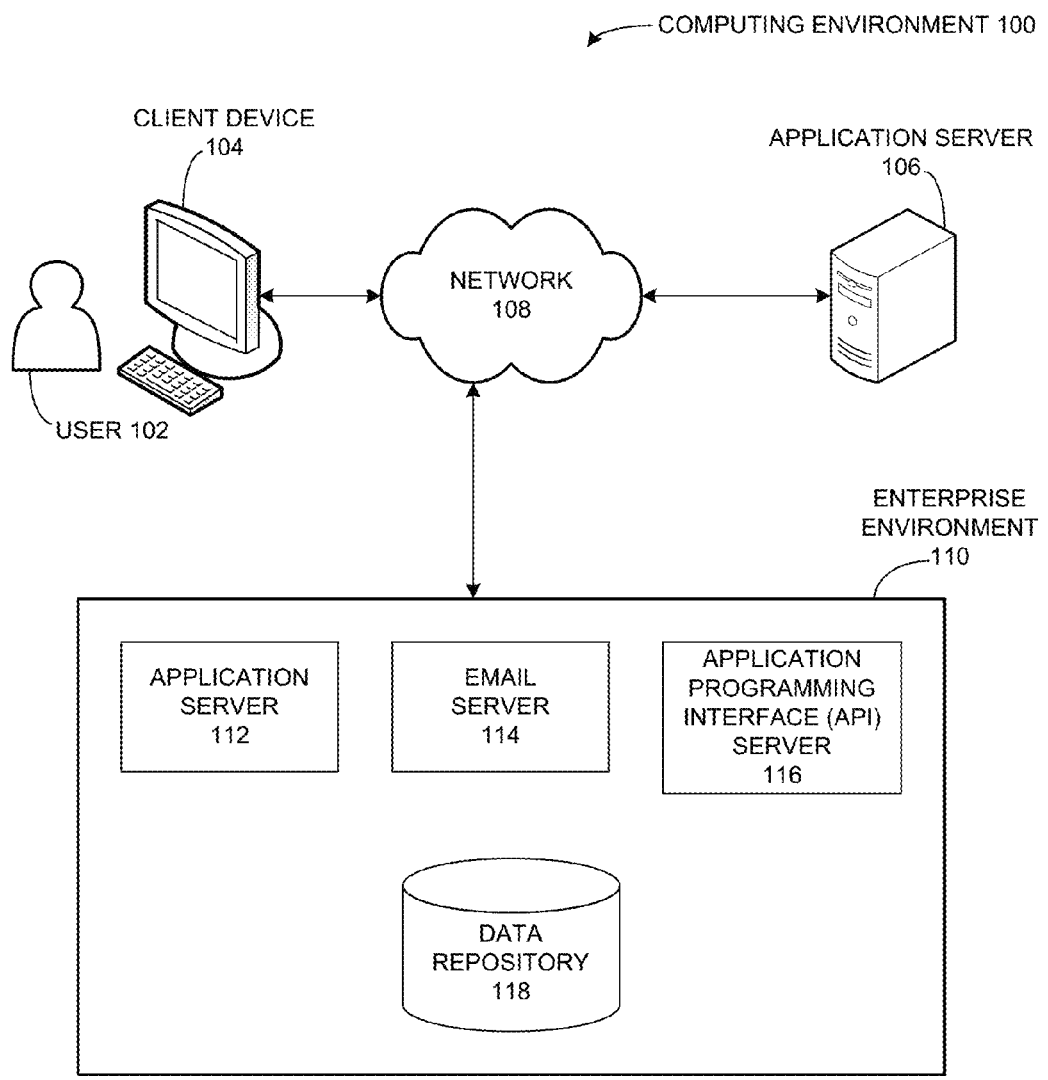
FIG. 1 illustrates an exemplary computing environment that facilitates presenting a relationship visualization to a user in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of informing a user how different entities of a nonhomogeneous collection are related by providing a visualization system that selectively displays a subset of contextual information pertaining to this relationship. For example, the visualization system can provide the user with a relationship visualization that can inform him that he is related to a certain document via a group project that he is collaborating on, and that he has received a recent copy of this document in an email from another group collaborator.

A document management system can provide relationship information indicating how documents, people, projects, topics, times, and places are related in any combination. Further, an online social network can provide relationship information indicating how a user is related to other people, either through friendships or within an organizational structure. The visualization system can gather this relationship information from the document management system and/or the online social network to generate a multipartite graph, and can infer additional relationship information from the contents of documents in the document management system and messages posted on the online social network. Further, this system generates the relationship visualization by selectively displaying a subset of contextual information, from the multipartite graph, that indicates a relationship between the two entities.

In some embodiments, the multipartite graph can include a plurality of entity nodes coupled by relation edges, such that a path that couples two entity nodes represents a relationship between the two entities. Further, an entity node of the relationship path indicates contextual information for a relationship between the two entities. Thus, when the relationship path includes nodes of more than one entity type, the visualization system can present the user with a visualization illustrating different types of contextual information that is useful in representing the relationship between the two entities.

An entity of the multipartite graph can correspond to a person, a data file or object of a certain data type, a project, an activity, an organization (e.g., a company or a project group), etc. Further, an entity can correspond to contextual information for a certain entity or a relationship between entities, such as: a topic word or phrase; a date range; contact information (e.g., a mailing address, email address, a phone number, a screen name or user handle), etc.

In some embodiments, an "activity" refers to an action performed by an entity, which can correspond to a simple activity such as "movement," or can correspond to a complex activity such as "conference paper writing." For example, an "undifferentiated activity" corresponds to a low-level human movements and actions, and a "differentiated activity" corresponds to an activity that is associated with temporally proximal and related (usually textual) content data. A "simply typed activity" can have simple patterns that can be extracted and typed. Further, a "richly typed and stateful activity" corresponds to an activity that can include multiple steps (e.g., states) and various related entities (e.g., names of objects needed to perform the event, and in which steps an object is to be used). Techniques for detecting an activity is described in U.S. patent application Ser. No. 13/171,087, entitled "SYSTEM AND METHOD FOR DETECTING HUMAN-SPECIFIED ACTIVITIES," which is hereby incorporated herein by reference.

Oftentimes, when a user is searching for information, it can be helpful for the user to understand how elements of this document management system and/or social network are related to each other. Unfortunately, the amount of relationship information surrounding a certain entity may be too much for the user to process quickly. In some embodiments, the relationship visualization system can select the most significant relationship information, and generate a visualization that can quickly inform the user how relevant a certain entity is to his search. For example, if the user is evaluating whether a certain document is worth reading, it may be helpful for the user to know how this document is related to people he trusts, to topics he is interested in, to projects he is participating in, and so forth.

FIG. 1 illustrates an exemplary computing environment 100 that facilitates presenting a relationship visualization to a user 102 in accordance with an embodiment. Computing environment 100 can include a client device 104, an application server 106, and/or an enterprise environment 110 coupled to a network 108. These computing devices can each include a data repository that stores information about different entity types, and information about relationships between entities. For example, client device 104 can correspond to a personal computer for user 102, and can include a storage device that stores personal information about user 102, a plurality of data files for user 102, and access information for application server 106 and/or enterprise environment 110.

Further, application server 106 can correspond to a web service (e.g., an online social network), and can include a data repository that stores a plurality of data objects and/or profile information for a plurality of people that are members of the web service. The profile information can indicate, for example, a person's birthdate, contact information, employer, personal and/or professional relationships, hobbies and personal interests, etc.

Enterprise environment 110 can include a plurality of computing systems hosting enterprise software for an organization (e.g., an employer for user 102), and can include a data repository 118 that stores a plurality of data objects and/or profile information for a plurality of members of enterprise environment 110.

In some embodiments, user 102 can use client device 104 to view a relationship visualization that illustrates a relationship between two entities (e.g., a relationship between user 102 and a document hosted by enterprise environment 110). For example, the user can access a user interface of client device 104 to select an icon corresponding to a document, and client device 104 can update the user interface to provide user 102 with a relationship visualization that provides insight to how the document and user 102 are related.

Client device 104 can generate the relationship visualization based on information gathered from a multipartite graph. In some embodiments, enterprise environment 110 can include an application server 112 that generates and maintains the multipartite graph that models relationships between different types of data found in computing environment 100 (e.g., nonhomogeneous entities found in client device 104, application server 106, an email server 114, and/or any other component of enterprise environment 110). In other embodiments, client device 104 can generate and maintain the multipartite graph using nonhomogeneous data entities found in computing environment 100, for example, by gathering information for these data entities via an application programming interface (API) server 116.

Figure 2:
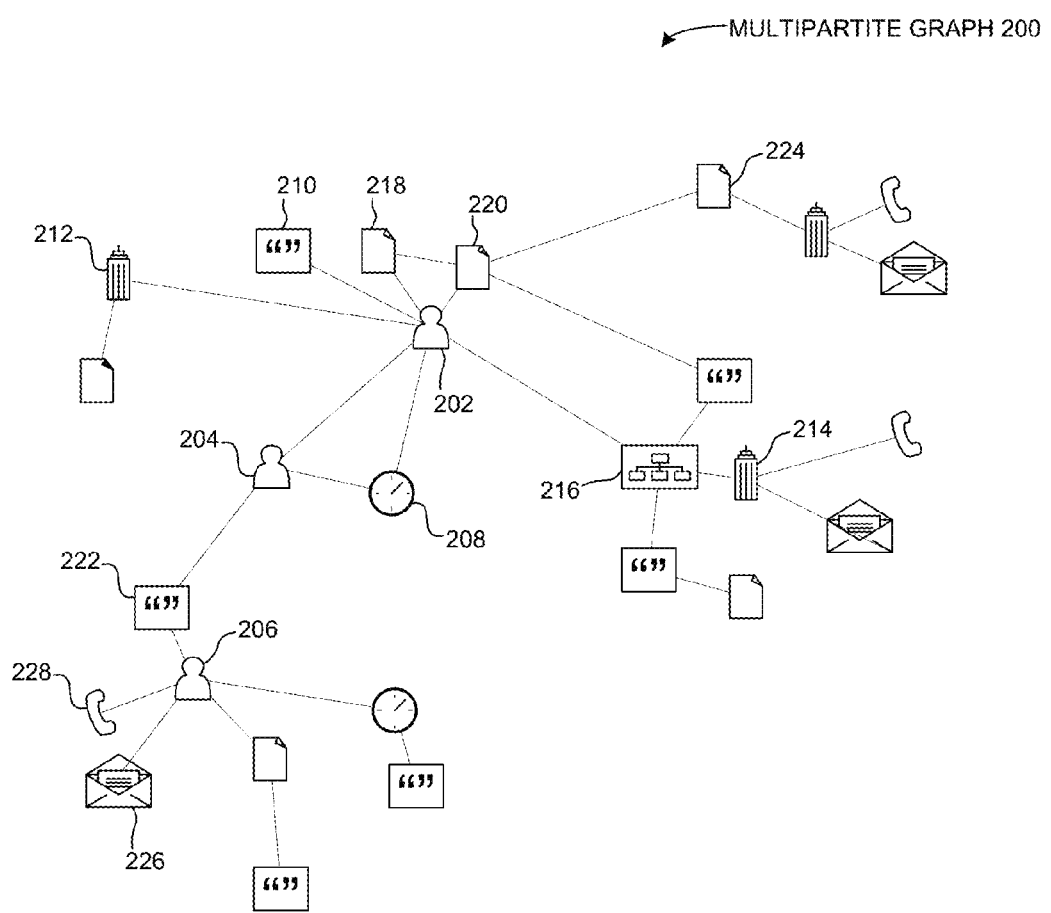
FIG. 2 illustrates a multipartite graph in accordance with an embodiment.

FIG. 2 illustrates a multipartite graph 200 in accordance with an embodiment. Multipartite graph 200 can include a plurality of nonhomogeneous entity nodes coupled by edges. An entity node can correspond, for example, to a person, a company, a document, a topic for an entity, a project, a date and/or time, an address, a telephone number, and the like. Multipartite graph 200 also provides relationship information that can be used by other embodiments to create a relationship visualization that can help a user understand how he or she is related to other entities in the graph (e.g., a document), and understand pairwise relationships between other entities in the graph.

In some embodiments, a "person" entity (e.g., entity 202) can indicate a person's full name, an abbreviated name, or any other name associated with a person such as an online handle. The online handle, for example, can include a screen name or an email address. Further, a "company" entity (e.g., entity 212) can indicate a company's full legal name, an abbreviated name, or any other version of the company's name such as a stock symbol.

A "document" entity (e.g., entity 220) can indicate a file name for a document. The file name, for example, can include a short name, a full file path within a file system, and/or a universal resource locator (URL). A "project" entity (e.g., entity 216) can indicate one or more names that are commonly used by different people to refer to the project. In some embodiments, the project entity can be associated with a named email distribution list (e.g., "Meshin Group"). Thus, the project entity can indicate the name for this email distribution list.

A "date-range" entity (e.g., entity 208) can indicate a range of dates and/or times, or can indicate a certain date and/or time instance. For example, a date and time combination can be presented using a compact string representation, such as "Thur. Nov 24, 2:52 PM," or "11/24/2011, 2:52 PM."

An "address" entity (e.g., entity 226) can indicate a mailing address, global positioning system (GPS) coordinates, or any identifier that can be used to indicate a physical location (e.g., Acme Headquarters). Further, a "telephone number" entity (e.g., entity 228) can indicate a telephone number for a certain entity.

In some embodiments, a "topic" entity (e.g., entity 210) can indicate a word or phrase corresponding to a named entity. The visualization system can include one or more named entity recognizers to determine a topic from the content of a certain entity (e.g., from a document). A named entity recognizer can recognize content including a date, a time, an email address, a location (e.g., a city, a state, and/or a country), an organization, a person, a street address, and a URL. Further, a named entity recognizer can also recognize conceptual information, such as a medical concept (e.g., a disease, a treatment, anatomy, physiology), a mathematical concept, a musical concept (e.g., a musical chord, a music genre, a band name, etc.), and other concepts.

Multipartite graph 200 can indicate a relationship between two entities when at least one relationship path exists between these two entities. Two entities that are directly related can be coupled by a single edge. Further, two entities that have an indirect relationship can be coupled by a relationship path that includes one or more other entity nodes coupled by edges.

In some embodiments, the relationship path(s) coupling two entities can be used to determine contextual information for their relationship. For example, users 202 and 204 can be direct "friends" within an online social network. Thus, graph 200 can include an edge coupling users 202 and 204 to indicate a direct relationship between them. Further, graph 200 can include a date range 208 coupled to users 202 and 204, which can indicate a date range for the relationship between users 202 and 204 (e.g., a start date at which point users 202 and 204 were "friended" in the online social network, and/or an end date on which one of users 202 and 204 "unfriended" the other).

As a further example, user 202 may be a technical consultant for a consulting company 212, and can be working on project 216 for a company 214. Thus, graph 200 can include an edge coupling user 202 directly to consulting company 212, and can include edges coupling a project 216 to user 202 and company 214. Further, graph 200 can also include edges coupling user 202 to a plurality of data objects created and/or modified by user 202 (e.g., documents 218 and 220 edited by user 202, a topic 210 attributed to user 202, etc.).

In some embodiments, a topic can be a word or phrase obtained from an instant message, an email message, a document, and/or any other entity. Moreover, two or more entities can be indirectly related to each other via a common topic. For example, user 204 may be a product manager associated with a particular product; thus, graph 200 can include an edge between user 204 and a product name 222 for this product. Further, user 206 may be a Web logger (blogger) that commonly writes reviews for this product. Thus, graph 200 can include a relationship path between users 204 and 206 that indicates that they are related by product name 222.

In some embodiments, an edge of the multipartite graph can have an associated weighted value that indicates the strength of a relationship. An edge's weighted value can be determined either individually for the edge, or can be determined based on the type of relationship being represented for the two entities coupled by the edge. For example, a relationship between two people that co-author a document may receive a weighted value of 100, while a relationship between two people that annotated the same document may receive a weighted value of 1.

Further, in some embodiments, some entity nodes may be more important than others. For example, a person high in a corporate structure may have a higher weighted value than a new hire. The visualization system can determine the weighted value based on the type of entity node. A "person" entity node, for example, can be assigned a higher weighted value than other types of entity nodes (e.g., higher than "date-range" or "document" entity nodes). In further embodiments, the weighted value for an entity node can be determined from a corporate structure (e.g., a job title), or based on ranking information provided by a plurality of individuals (e.g., votes from an online social network). Further, the weighted values for a collection of entity nodes can be normalized (e.g., into the decimal range [0, 1]).

Figure 3:
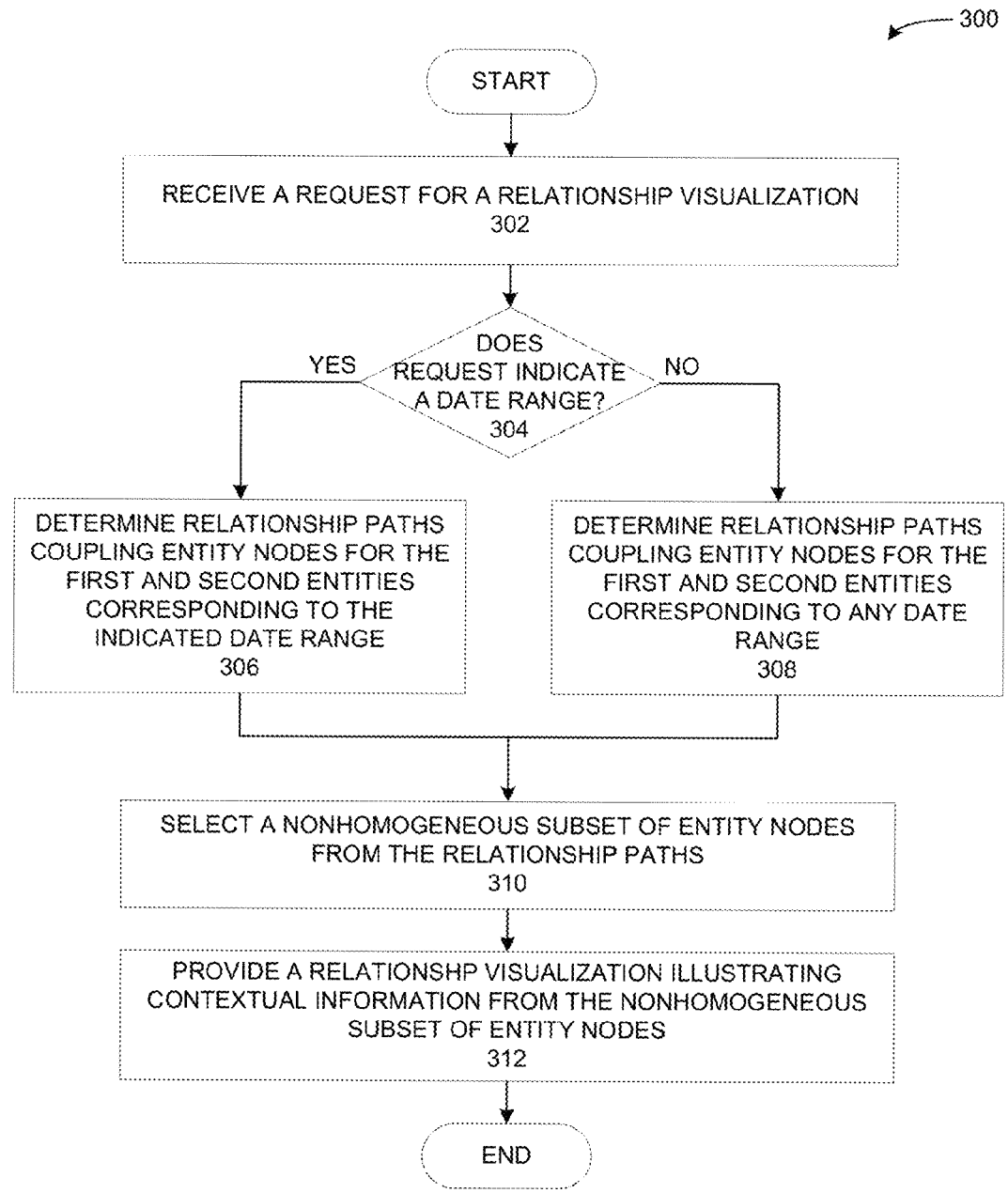
FIG. 3 presents a flow chart illustrating a process for providing a relationship visualization in accordance with an embodiment.

FIG. 3 presents a flow chart illustrating a process 300 for providing a relationship visualization in accordance with an embodiment. During operation, the system can receive a request for a relationship visualization (operation 302). The request can indicate a desired type of relationship visualization, and can also indicate two entities of the multipartite graph for which the system is to generate the relationship visualization. The type of relationship visualizations can include a relationship graph, or can include a listing of relationship contextual information that is presented along one or more axes. For example, a first entity can be a user within a computing environment (e.g., a member of an organization), and a second entity can be a document on which the user has collaborated with other coworkers. Further, a first axis of the relationship visualization can correspond to a range of entity types from which the contextual information is collected, and a second axis can correspond to a timeline.

The request can also indicate a contextual constraint that influences how the system selects the information to display in the relationship visualization. The contextual constraint can include an entity type, a date range, a member of an organization, a topic word or phrase, or any contextual information from any entity type of the multipartite graph. Thus, for the example above, the system can generate a relationship visualization that illustrates information indicating how the user is related to the document, such that the information is filtered based on the contextual constraint. The information presented by the relationship visualization can include modification dates for the document, quotes received from co-authors via emails regarding the document, projects to which the document belongs, etc.

Next, the system determines whether the request indicates a date range (operation 304). If so, the system determines one or more relationship paths coupling entity nodes for the two entities, such that the relationship paths correspond to the indicated date range (operation 306). However, if the system determines at operation 304 that the request does not indicate a date range, the system determines the relationship paths that couple entity nodes for the two entities, such that the relationship paths correspond to any date range (operation 308).

Then, the system selects a nonhomogeneous subset of entity nodes from the relationship paths (operation 310). In some embodiments, an entity node indicates contextual information corresponding to a relationship between the two entities of the multipartite graph. Also, the system can assign significance scores to entity nodes in the relationship paths to indicate an entity node's significance to the relationship between the two entities of the visualization request. Thus, during operation 310, the system can select the nonhomogeneous subset of entity nodes based on their significance scores to determine contextual information from the most significant entity nodes in the relationship paths. The system then provides a relationship visualization that displays contextual information from this nonhomogeneous subset of entity nodes (operation 312).

Selecting Entity Nodes from k Shortest Paths

In some embodiments, during operation 310, the system can select a subset of entity nodes from k shortest paths between the proximal and distal entity nodes. In doing so, the system computes the length of a relationship path based on the weighted values for the entity nodes and edges in the relationship path. For example, given that a weighted value for an edge in the multipartite graph indicates the strength of a relationship between the two entities that it couples, the system can determine an edge's length (e.g., the distance between two entities coupled by the edge) by computing the reciprocal of the edge's weighted value. Thus, to compute the length of a relationship path, the system can compute the sum of the lengths of the edges in the relationship path. Further, given that a weighted value for an entity node indicates the entity node's importance, the system can adjust a relationship path's length by subtracting the weighted values for the entity nodes in the relationship path.

In some embodiments, the system can compute the length of a relationship path by using a path weighting function $f(p)$ to determine a weight for a path p. Then, the system can compute a weighted length for a relationship path p of distance d by computing $d*f(p)$. The weighting function $f(p)$ can take into account the individual weighted values for the entity nodes and/or edges, and the global nature of the path itself (e.g., whether there is at least one person node involved and a sufficient amount of topic nodes, etc.).

Therefore, to select N most significant nodes, the system can first determine k shortest paths between the proximal and distal entity nodes. Then, the system can select, from the k shortest paths, N entity nodes that have a shortest path to the distal entity node. For example, the system can begin with k=1 to determine the shortest path, and selects at most N entity nodes from this shortest path. Then, if the system has selected fewer than N entity nodes, the system can increment k (e.g., increment k by one) to determine more shortest paths, until the system has selected N entity nodes. In some embodiments, the system can assign a significance score to each entity node in these k shortest paths based on its computed distance to the distal entity node (e.g., the significance score can be computed as the reciprocal of its distance to the distal entity).

Selecting Entity Nodes Using Spreading Activation

In some embodiments, the visualization system computes a significance score for an entity node, such that this significance score indicates the entity node's significance to a relationship between two other entity nodes (e.g., its significance within a set of relationship paths between the two entity nodes). Then, during operation 310, the system can select a subset of entity nodes that have a highest significance score. For example, within a company, it is likely that a project manager is more closely related to a certain document than would be the CEO of the company. Thus, even though the CEO's entity node may have a higher weighted value than that of the project manager's entity node, the visualization system can use significance scores to recognize when the project leader is more significant to a user's relationship to the document than the CEO.

In some embodiments, the system can determine a significance score for an entity node by determining the significance of the entity node to the flow (in the multipartite graph) between two related entity nodes. For example, the system can compute a flow between two related entity nodes by computing a spreading activation, across a multipartite graph, from a proximal entity node toward a distal entity node. In doing so, the system assigns an activation value to the proximal entity node, and propagates activation values through the multipartite graph toward the distal entity node. In some embodiments, an entity node $a_i$ propagates an activation value $pa_i$ to other entity nodes that entity node $a_i$ is directly connected to, such that $p<1$. Therefore, even if the multipartite graph includes a relationship loop, the activation values can converge throughout the multipartite graph toward a steady state. Further, once the system propagates the activation values to a steady state, the system can use the distal entity node's activation value as the flow from the proximal entity node toward the distal entity node. Spreading activation is described in the Journal of Experimental Psychology (Anderson, J. R., & Pirolli, P. L. Spread of activation. (1984). *Journal of Experimental Psychology: Learning, Memory, & Cognition,* 10, 791-799), which is hereby incorporated herein by reference.

Figure 4:
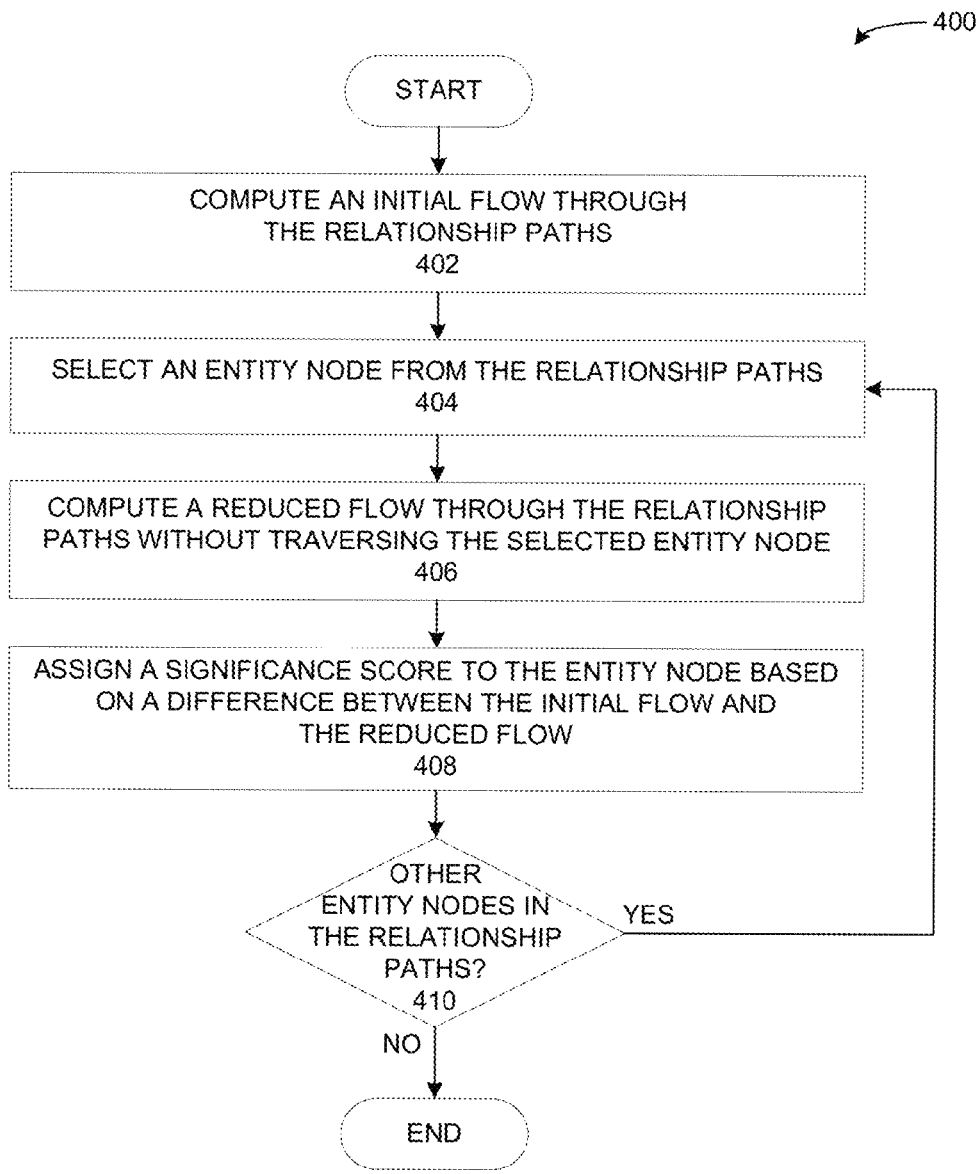
FIG. 4 presents a flow chart illustrating a process for determining a significance score for entity nodes along relationship paths to a distal entity node in accordance with an embodiment.

FIG. 4 presents a flow chart illustrating a process 400 for determining a significance score for entity nodes along relationship paths to a distal entity node in accordance with an embodiment. During operation, the system computes an initial flow through the relationship paths (operation 402). For example, the system can compute the initial flow by computing the spreading activation value that propagates from a proximal entity node (e.g., a node corresponding to a user) to the distal entity node (e.g., a node corresponding to a document) of the relationship paths. Then, the system selects an entity node from the relationship paths (operation 404), and computes a reduced flow through the relationship paths without traversing the selected entity node (operation 406). For example, to determine a reduced flow corresponding to a node $a_j$, the system can perform spreading activation through the relationship paths without propagating activation values to/from node $a_j$.

Next, the system assigns a significance score to the selected entity node based on a difference between the initial flow and the reduced flow (operation 408). The system then determines whether there are other nodes in the relationship paths whose significance score needs to be determined (operation 410). If so, the system returns to operation 404 to select another entity node to determine its significance score.

Selecting Entity Nodes from Relationship Paths

In some embodiments, the system can determine contextual information for a relationship between two entity nodes by first generating a plurality of sorted relationship paths between the two entity nodes. Further, the system can group entity nodes of each relationship path into one or more context groups, and can select contextual information from these context groups to display in a relationship visualization.

Figure 5:
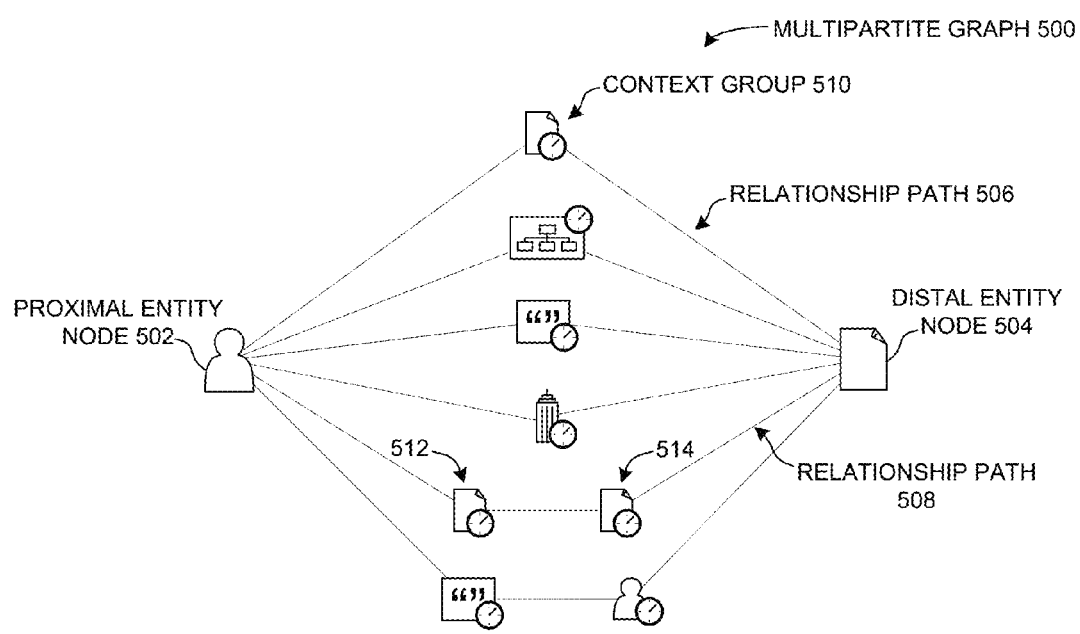
FIG. 5 illustrates a multipartite graph that includes a plurality of sorted relationship paths in accordance with an embodiment.

FIG. 5 illustrates a multipartite graph 500 that includes a plurality of sorted relationship paths in accordance with an embodiment. Multipartite graph 500 can include a proximal entity node 502 and a distal entity node 504. For example, proximal node 502 can correspond to a user that submits a search query for a document, and distal entity node 504 can correspond to the document that matches the search query. Further, sorted multipartite graph 500 can include one or more relationship paths (e.g., relationship paths 506 and 508). Each relationship path can include entity nodes of a multipartite graph that couple entity node 502 to entity node 504.

The system can group entity nodes in a relationship path into one or more context groups, and can sort the relationship paths based on contextual information of the context groups. A context group can include a collection of nodes of the multipartite graph that are related to an entity node that satisfies an entity constraint. Thus, the context group can include additional contextual information that is related to the contextual constraint. For example, the system can receive a visualization request indicating that the entity nodes are to be grouped based on their corresponding timestamps, and that the relationship paths are to be sorted based on the timestamp values for these context groups. Thus, the system can create context groups that include entity nodes related to a date-range entity node, and can sort the relationship paths based on the date information from the context groups.

Oftentimes, recent relationships can be more important than older relationships. Thus, the system can use time information to assign a higher score to newer entities, which causes these higher-scoring entities to be displayed in a relationship visualization. For example, in multipartite graph 500, the system associates nodes with a time range or set of time ranges (indicated by the clock icon on each node). Then, the system can compute a score for these entity nodes based on their time range(s) to determine which entity nodes should be displayed in the relationship visualization.

In the common case where the user is most interested in recent relationships, the system can assign a higher score to entity nodes with a more recent time range. In the case that the user has specified another focus time, the system can assign a higher score to entity nodes whose time range is closer to the specified time. For example, the system can compute an entity node's score using the equation:

$$1/(\log_{10}(10+|rT|))$$

where $|rT|$ is the magnitude of an entity node's difference in time from the user's specified time (or from the current time) in seconds. The logarithm in the equation causes the score to decay relatively slowly, where a time difference of a week is scored slightly lower than a time difference of a day. Different time scaling functions are possible. In some embodiments, the system can use a different scoring function for each node type. In other embodiments, the system can use a different scoring function for each entity node. Thus, some entity nodes or entity types can "age" faster or more slowly than others.

In multipartite graph 500, relationship path 506 includes one context group 510 that couples entity node 502 to entity node 504. Context group 510 can include a date-range entity node and a document entity node. The document entity node, for example, can correspond to a different version (e.g., a recent or prior version) of the document represented by entity node 504, and the date-range entity node can indicate a date and/or time at which the user (represented by entity node 502) created or modified this different document version.

In some embodiments, an entity node can correspond to two or more relationship paths of multipartite graph 500. For example, in multipartite graph 200 (see FIG. 2), document 220 is included in multiple relationship paths between entity nodes 202 and 224. In one path, document 220 is directly related to entity nodes 202 and 224. In another path, document 220 is related to entity node 202 through document 218. Thus, in multipartite graph 500, context groups 510 and 514 can correspond to document 220 of FIG. 2, and context group 512 can correspond to document 218 of FIG. 2.

While the entity types at the proximal and distal nodes of multipartite graph 500 correspond to a user and a document, respectively, the entity type can vary at the proximal and/or distal entity node of a multipartite graph. For example, the distal entity type can correspond to an email message, a person, a company, a topic, an address, a date, etc. These variations to multipartite graph 500 can facilitate the user in determining how he is related to any desired entity (e.g., a topic).

As another example, the proximal entity can correspond to an entity other than the user. It could be a different person, in which case the visualization would facilitate in answering a question such as "How is Joe connected to the distal entity?" The proximal entity could also correspond to a non-person entity, in which case multipartite graph 500 facilitates the user in determining how one entity of interest (e.g., a topic) is related to another entity (e.g., a project).

Generating a Relationship Visualization

In some embodiments, the system can generate a relationship visualization based on the context groups from one or more relationship paths.

Figure 6:
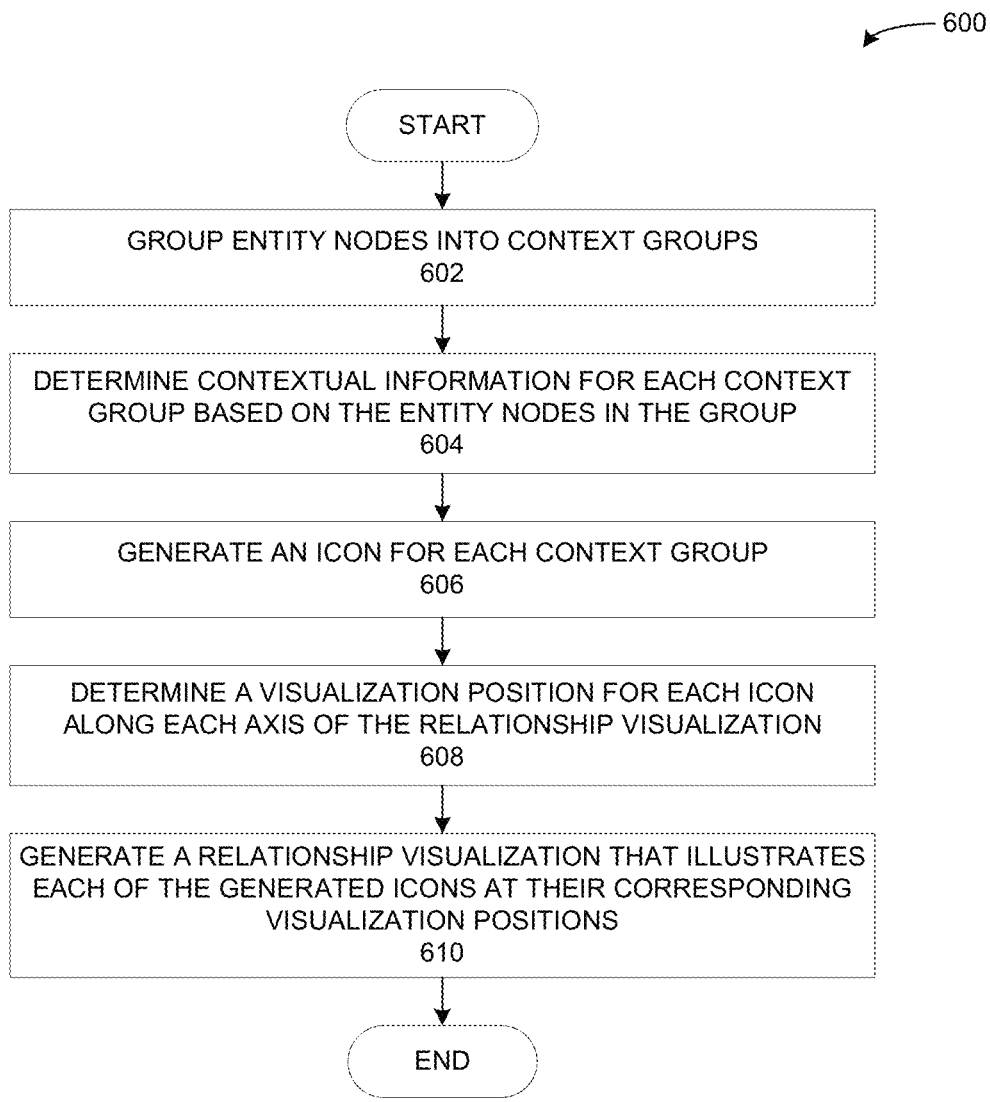
FIG. 6 presents a flow chart illustrating a process for generating a relationship visualization in accordance with an embodiment.

FIG. 6 presents a flow chart illustrating a process 600 for generating a relationship visualization in accordance with an embodiment. During operation, the system groups entity nodes of the multipartite graph into a set of context groups (operation 602). A context group can include a collection of nodes of the multipartite graph that are related to an entity node that satisfies an entity constraint. Thus, the context group can include additional contextual information that is related to the entity constraint. The system then determines contextual information for each context group based on the entity nodes in the group (operation 604).

Next, the system can generate an icon for each context group (operation 606). In some embodiments, a context group's icon can indicate the various entity types that are within a context group. For example, the icon can include overlapping images that correspond to each of the various entity nodes within the context group. In other embodiments, the system can generate a text string that indicates the contextual information from one or more entity nodes in the context group. The text string can indicate, for example, the contextual information corresponding to the highest-weighted entity node of the context group.

The system can then determine, for each icon, a visualization position along each axis of the relationship visualization (operation 608). In some embodiments, an axis of the relationship visualization can correspond to a set of possible entity types, a weighted value, a date/time range, etc. The system then generates a relationship visualization that illustrates each of the generated icons at their corresponding visualization positions (operation 610).

Relationship Visualizations

In some embodiments, a user may desire to see contextual information that indicates how two different entities are related. For example, the system can receive a search query from the user for a certain entity, such as a document, and then generates a sorted multipartite graph that includes relationship paths between the user and the searched entity. The system can then provide a relationship visualization that illustrates how the user and the searched entity are related based on these relationship paths.

In some embodiments, this relationship visualization can provide contextual information along one axis to indicate how the user is related to the searched entity. In other embodiments, the relationship visualization can take advantage of horizontal space in a display area to show rich contextual information from the multipartite graph. For example, the relationship visualization can use the horizontal space to show the passage of time, or to show several examples of the same entity type (e.g., displaying the names of multiple people, or displaying values of multiple attributes, such as phone numbers or project names).

Figure 7A:
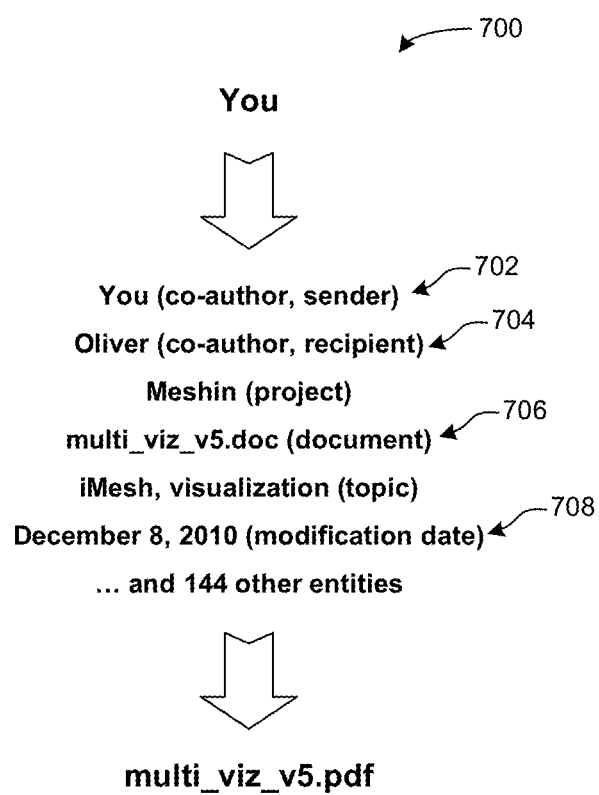
FIG. 7A illustrates a relationship visualization for a non-homogeneous collection of data entities in accordance with an embodiment.

FIG. 7A illustrates a relationship visualization 700 for a nonhomogeneous collection of data entities in accordance with an embodiment. In relationship visualization 700, the proximal entity is the user and the distal entity is a PDF document. Further, relationship visualization 700 provides entities that connect the proximal and distal entities, and indicates the nature of their relationship to the distal entity (e.g., to the PDF document). Given the PDF document, the system automatically has found its co-authors. The system has also found the editable source (a Microsoft Word document in this case) of the document, and a newer version of the editable source. The system also indicates the modification date for the document, and indicates email messages in which the document was sent to facilitate the user in finding related documents and other contextual information.

In some embodiments, relationship visualization 700 can provide sorted contextual information along one dimension. This contextual information can be sorted based on a weighted value for the corresponding entity nodes of the multipartite graph (e.g., multipartite graph 200 of FIG. 2, or multipartite graph 500 of FIG. 5), and can correspond to any entity type. For example, the weighted value can be determined based on its proximity to the user in the multipartite graph, and/or its significance to the relationship between the user and the searched entity.

Relationship visualization 700 can display an entity type corresponding to each piece of contextual information. For contextual information in relationship visualization 700 that corresponds to a person, the system can also display the role of this person. For example, relationship visualization 700 can include contextual information 702 and 704 indicating that the user ("You") and a person named Oliver are co-authors of the document being searched. Further, contextual information 702 can indicate that the user is the sender of the document (e.g., via an e-mail message), and contextual information 704 can indicate that Oliver is the recipient of the document.

In some embodiments, when contextual information in relationship visualization 700 corresponds to a data file, the system can display the contextual information so that it indicates the file type. For example, relationship visualization 700 can include contextual information 706 indicating that the file "multi_viz_v5.doc" is a "Word document." Further, when contextual information corresponds to a date or date range, the system can display the contextual information so that it indicates what was performed during this date range. For example, relationship visualization 700 can include contextual information 708 indicating that Dec. 8, 2010 corresponds to a file modification date.

In some embodiments, the system can provide a two-dimensional relationship visualization indicating how a user is related to an entity that the user is searching for. This relationship visualization can provide contextual information from one or more selected relationship paths along two axes to indicate how the user is related to the searched entity. For example, the user can search for a company named "Acme Rocket Engines, Inc.," and the system can generate a relationship visualization that illustrates contextual information from a plurality of entity nodes from multiple paths of a multipartite graph.

Figure 7B:
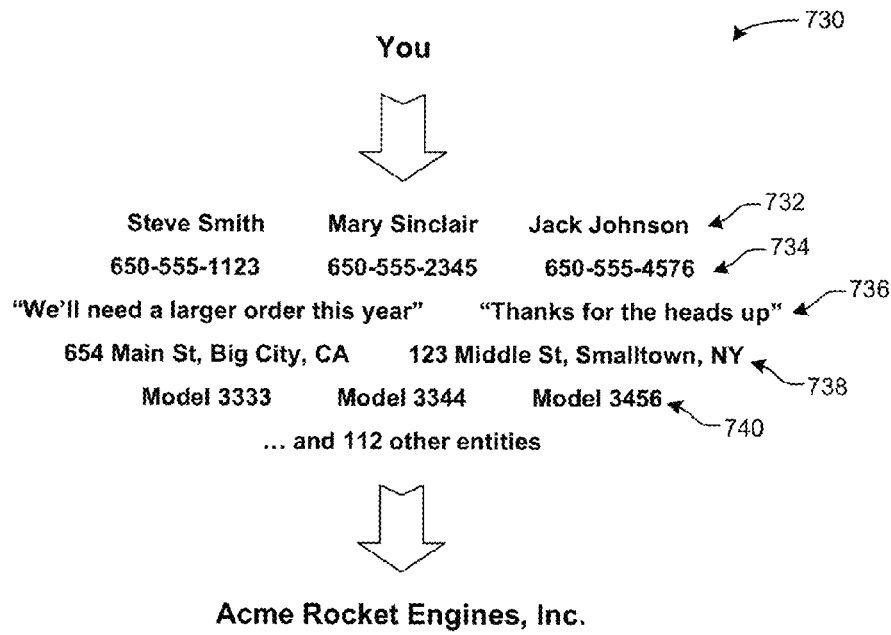
FIG. 7B illustrates a two-dimensional relationship visualization for a nonhomogeneous collection of data entities in accordance with an embodiment.

FIG. 7B illustrates a two-dimensional relationship visualization 730 for a nonhomogeneous collection of data entities in accordance with an embodiment. Relationship visualization 730 can provide sorted contextual information along two dimensions: a vertical axis and a horizontal axis. Specifically, relationship visualization 730 makes use of horizontal space in a display area to illustrate additional contextual information that is relevant to a relationship of a user (e.g., "You") and a company (e.g., "Acme Rocket Engines, Inc.").

In some embodiments, each level of the vertical axis can correspond to a different entity type. Further, the contextual information at a certain level of the vertical axis can be sorted based on a computed score or weight for the corresponding entity nodes of the multipartite graph. For example, the position for certain contextual information can be determined from its entity node's weighted value (e.g., indicating its importance in the multipartite graph) or from its entity node's significance score (e.g., indicating its significance to the relationship between the user and the company).

Relationship visualization 730 can include a plurality of context rows along the vertical axis (e.g., context rows 732, 734, 736, 738, and 740). Context row 732 can correspond to the "person" entity type, and can display contextual information corresponding to people that associate the user to the searched entity. In some embodiments, the displayed names can be sorted such that "Steve Smith" may be a person associated with the searched entity that has the closest relationship to the user (e.g., "Steve Smith" is the closest entity to the user along relationship paths between the user and the searched entity). In other embodiments, "Steve Smith" may provide the strongest relationship to the searched entity (e.g., "Steve Smith" is the most significant entity, with the highest weighted value, along relationship paths between the user and the searched entity). Further, context row 734 can correspond to the "telephone number" entity type, and can display telephone numbers that correspond to the people presented in context row 732.

Context row 736 can correspond to the "topic" entity type, and can display topic words or phrases that can remind the user of his relationship to the searched entity. For example, the contextual information in row 736 can correspond to phrases mentioned in messages between the user and employees of the Acme Rocket Engines company. Context row 738 corresponds to the "address" entity type, and can display addresses corresponding to a company (e.g., addresses for the Acme Rocket Company) or people associated with the searched entity. Further, context row 740 can correspond to the "project" entity type, and can display project names (e.g., related to people) along relationship paths between the user and the searched entity.

Figure 7C:
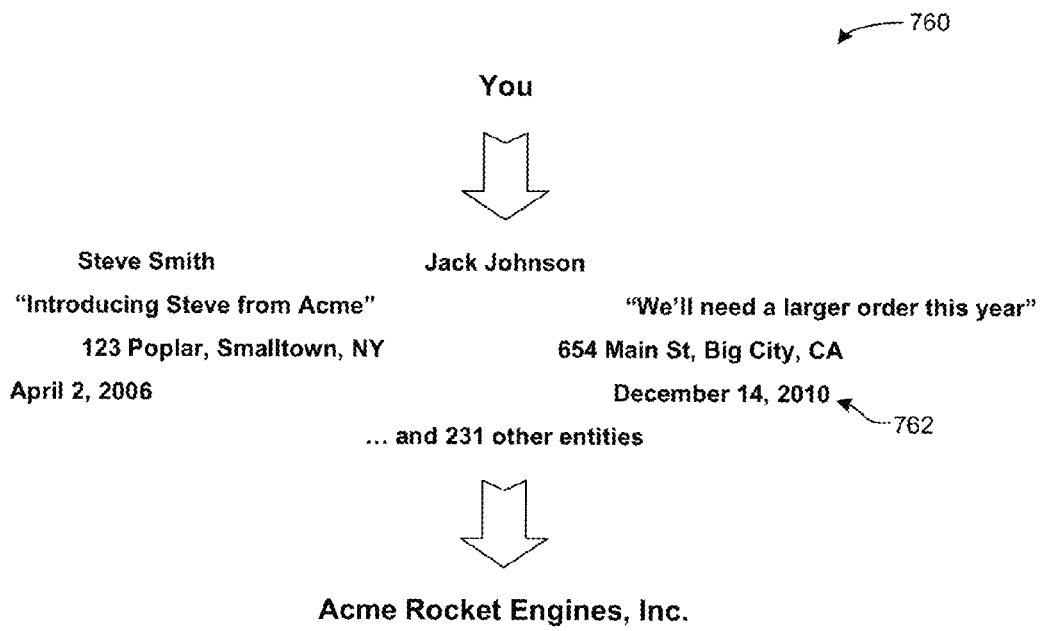
FIG. 7C illustrates a time-centric relationship visualization for a nonhomogeneous collection of data entities in accordance with an embodiment.

FIG. 7C illustrates a time-centric relationship visualization 760 for a nonhomogeneous collection of data entities in accordance with an embodiment. Relationship visualization 760 presents entities that connect the user ("You") to a company ("Acme Rocket Engines"). Relationship visualization 760 can provide sorted contextual information along two dimensions: a vertical axis and a horizontal axis. Entities toward the left of the display area are associated with information farther in the past, and entities toward the right are associated with more recent information. Further, each level of the vertical axis can correspond to a different entity type.

The contextual information at a certain level of the vertical axis can be sorted based on a timestamp or a date range for corresponding entity nodes of the multipartite graph. In some embodiments, the horizontal axis of relationship visualization 760 corresponds to a date range, and a piece of contextual information is assigned a horizontal position based on its corresponding date range. As an example, context row 762 can indicate important dates from this date range.

Relationship visualization 760 can remind the user about aspects of his history with the company "Acme Rocket Engines." For example, visualization 760 can remind the user that he received an email in 2006 entitled "Introducing Steve from Acme," which was his first contact with Acme Rocket Engines. It can also remind him that Steve Smith was his original contact, and at that time, Acme was in Smalltown, N.Y. Further, it can remind him that Jack Johnson is his new contact ever since Steve left the company, and that the company has since moved to California. The user's most recent message from Jack has the title "We'll need a larger order this year."

Figure 7D:
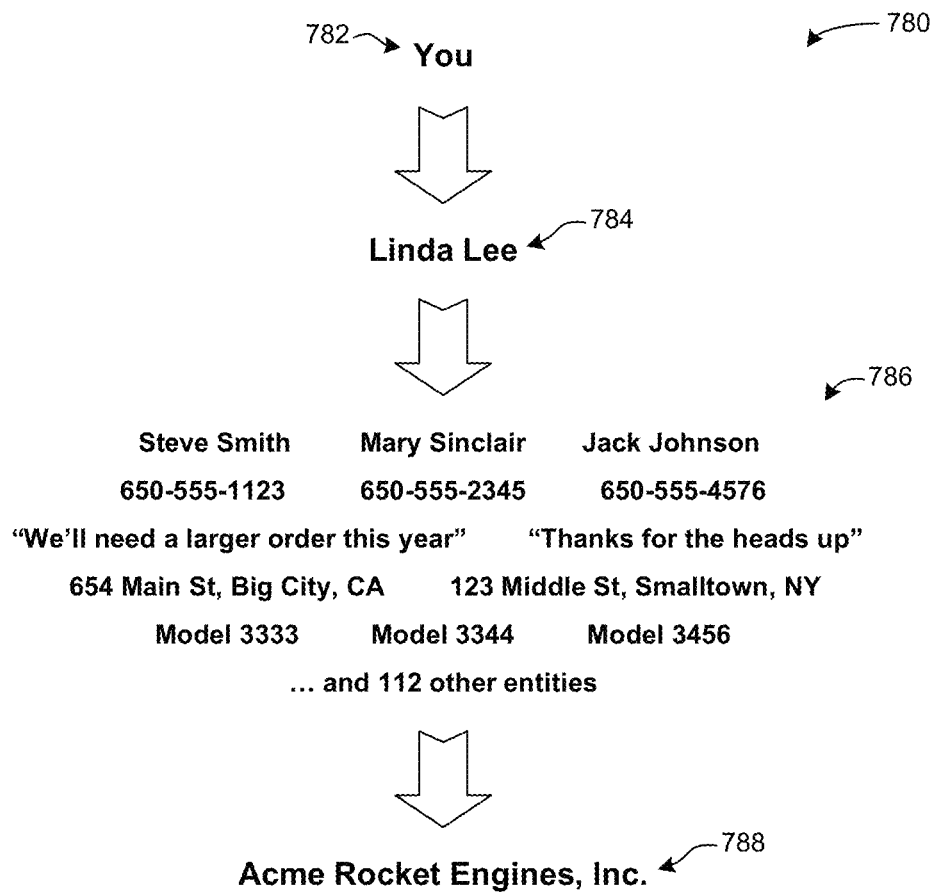
FIG. 7D illustrates a multi-hop relationship visualization for a nonhomogeneous collection of data entities in accordance with an embodiment.

FIG. 7D illustrates a multi-hop relationship visualization 780 for a nonhomogeneous collection of data entities in accordance with an embodiment. Relationship visualization 780 can provide sorted contextual information between a proximal entity 782 (e.g., a user, "You") and a distal entity 788 via one or more intermediate entities (e.g., entity 784). For example, relationship visualization 780 makes use of vertical space in a display area to illustrate contextual information 786 that relates intermediate entity 784 (e.g., "Linda Lee") to distal entity 788 (e.g., a company, "Acme Rocket Engines, Inc."). Further, in some embodiments, relationship visualization 780 can illustrate other contextual information (not shown) that relates proximal entity 782 to intermediate entity 784.

In some embodiments, contextual information 786 can correspond to a one-dimensional relationship visualization, a two-dimensional relationship visualization, or a time-centric relationship visualization (e.g., visualization 700, 730, or 760 of FIG. 7A, 7B, or 7C, respectively).

Document Centrality

In some embodiments, relationship information can be determined by applying contextual constraints on the multipartite graph. For example, the system can discover knowledge about the relationships between people, companies, projects and other entities from documents (e.g., an email or a text document). The system can discover these relationships either because the text of a document mentions an entity or because the metadata of the document (such as the sender or recipient of an email message) correspond to an entity. Thus, to determine relationships from documents, the system can generate a document-centric multipartite graph by constraining the multipartite graph (e.g., graph 200) so that all edges contain a document at one or both ends.

The system can use the document-centric multipartite graph to determine relationship information for entities that are not documents, by starting with document entities. For example, the strength of an association (e.g., edge weight) between a person and a project can be computed based on a number of documents that connect these two entities.

Further, the system can incrementally update edge weights as new documents become available (e.g., when a new email message arrives). These new documents can provide new evidence of the connection between any pair of entities, and can associate this connection with a new time (e.g., a recent timestamp). The system can still use information that it has already extracted from documents that were previously seen, and does not need to calculate the corresponding edge weights again.

Figure 8:
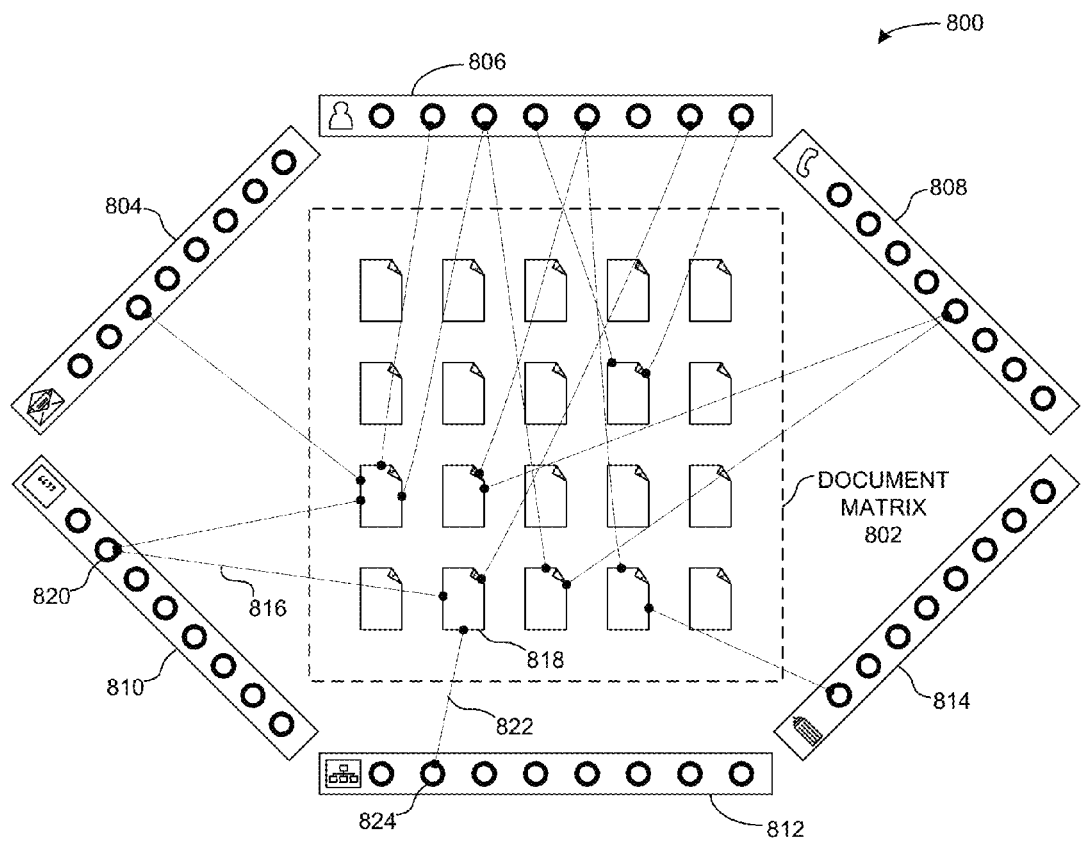
FIG. 8 illustrates a document-centric relationship visualization for a nonhomogeneous collection of data entities in accordance with an embodiment.

FIG. 8 illustrates a document-centric relationship visualization 800 for a nonhomogeneous collection of data entities in accordance with an embodiment. Relationship visualization 800 illustrates which documents provide support for a relationship to other entities of any type. For example, the user may submit a visualization request that includes an entity constraint indicating a topic, and the system can generate a document-centric multipartite graph for the request. The system can then use the document-centric multipartite graph to generate document-centric relationship visualization 800 so that it displays the documents that match the desired topic, and displays which other entities are related to each other through these documents.

In some embodiments, the system can generate relationship visualization 800 so that it includes a document matrix 802 corresponding to a plurality of document entities, and includes a plurality of icon vectors (e.g., icon vectors 804, 806, 808, 810, 812, and 814) each corresponding to a certain entity type.

Document matrix 802 can comprise two axes, and the icons in document matrix 802 can be positioned along each of the two axes in a sorted or unsorted order. For example, the horizontal axis can correspond to a timeline, and an entity's icon can be positioned along the horizontal axis based on a corresponding date range. Further, each document icon can have a weighted value, and can be positioned along the vertical axis based on the weighted value. The system can determine a document icon's weighted value, for example, by scoring how well the corresponding document matches the user's search query. As another example, the system can determine a document icon's weighted value by determining how closely related the corresponding document is to the user.

Further, an icon vector (e.g., icon vector 804, 806, 808, 810, 812, or 814) can correspond to a certain entity type different than that of document matrix 802. In some embodiments, the icon vectors are positioned in relationship visualization 800 to surround document matrix 802. Further, each icon vector can include one axis, and can include a plurality of icons positioned along this axis so that each icon represents a certain entity node of the multipartite graph. The icons can be sorted along the icon vector's axis based on a weighted value, or can be unsorted.

Relationship visualization 800 can also include one or more connectors to represent a relationship between a document entity and a target entity (e.g., a document represented in document matrix 802 or an entity represented in an icon vector). For example, a connector 816 indicates a relationship between a document icon 818 and a topic icon 820. Also, a connector 822 indicates a relationship between document icon 818 and a project icon 824. Thus, the user can see that topic 820 and project 824 are related by document 818.

In some embodiments, the system can also use the document-centric multipartite graph (illustrated by document-centric relationship visualization 800) to generate other relationship visualizations, such as a one-dimensional relationship visualization, a two-dimensional relationship visualization, a time-centric relationship visualization, or a multi-hop relationship visualization (e.g., visualization 700, 730, 760, or 780 of FIG. 7A, 7B, 7C, or 7D, respectively). For example, a relationship between two entities (e.g., the proximal entity ("You") and an intermediate entity, or the intermediate entity and the distal entity) can be found in one or more documents of the document-centric multipartite graph.

Named Entity Extraction

In some embodiments, the visualization system considers the kinds of relationships that exist between any pair of entities when determining which entities to include in the visualization. The system can consider relationships between two entities by performing named entity extraction on the collection of entities. Thus, the relationship strength between two entities (e.g., documents, messages, etc.) increases with the number of high-value entities that they have in common. Further, an entity's value can increase along with its rarity in the collection, and/or its weighted value.

Table 1A and Table 1B list information considered by the visualization system to determine a relationship between two entities in accordance with some embodiments. The rows and columns of Tables 1A and 1B correspond to 5 entity types: a document, a person, an activity, an entity, and a date/time range. Because relationships are not always symmetrical, Tables 1A and 1B consider both relationships in which a node (acting as a "hub" in the sense of Kleinberg Hyperlink-Induced Topic Search (HITS)) can be said to "recommend" or to "be recommended by" another node (acting as an "authority" in the sense of Kleinberg HITS).

As an example, the cell [Document, Document] in Table 1A indicates how the system can determine that a document A recommends another document B. In some embodiments, the system determines this relationship by determining that: document A has a hyperlink that points to document B; document A cites document B (e.g., in a references section or plain text mention), and/or an annotation in document A points to document B. Further, the system can determine that documents A and B are related if both documents are attached to the same email, or a third document C has a hyperlink pointing to both documents A and B.

As another example, the cell [Document, Entity] in Table 1B indicates how the system can determine that a document D recommends an entity E. In some embodiments, the system can determine this recommendation by determining that document D mentions entity E (e.g., using named entity recognition), or that document D is sent in an email that mentions entity E. Further, the system can also determine this recommendation by determining that an annotation on document D mentions entity E, or that document D is tagged or placed in a category or folder whose name contains one of the names of entity E.

TABLE 1A

Sources of Relatedness

Authority

| Hub | Document | Person | Activity |
|---|---|---|---|
| Document | Hyperlink in document, hyperlink in email, citation in document, annotation link, co-attachments, co-hyperlinks. | Mention. Authorship. Annotation author. Tag author. Email sender/recip. with attachment. | Task->Tag->Doc. Task->Annot->Doc. Activity->Folder->Doc. Activity->Repos.->Doc. |
| Person | Comment. Tag. Authorship. Email attachment. Repository upload. | Email sender/recip. Co-recipient. Co-authors. Activity co-participants. Co-mention in text corpus. | Person is member. Activity->Doc-> Author. Person sends email to Activity's list. |
| Activity | Task->Tag->Doc. Task->Anno->Doc. Activity->Folder->Doc. Activity->Repo->Doc. | Person is member. Task contributor. | Sub-activity. Shared entity. Doc co-tagged under both activities. People in common. Time overlap. |
| Entity | Direct mention. Alias mention. (See [Document, Entity] in Table 1B) | Person rates entity. Person extracts/highlights entity. Author of entity relationship. | Part of Activity's entity list. Mention in doc of Activity. |
| Date/Time Range(s) | Creation date. Modify dates. Email dates. Repository dates. Annotation dates. Doc. mentions time. | Date of birth and/or death. Publication dates. Document creation dates. Annotation dates. Email send time. XLE time relationship. | Document, person, or entity in the Activity is associated with one or more times. Tag, annotation, email times. |

TABLE 1B

Sources of Relatedness (continued)

Authority

| Hub | Entity | Date/Time Range(s) |
|---|---|---|
| Document | Doc->email->recipient = entity. Doc->entity. Doc->email->entity. Doc->anno->entity. Doc->tag = entity. | Creation date. Modify dates. Email dates. Repository dates. Annotation dates. Document mentions time. |
| Person | Author->doc->entity. Tags with entity. Author of anno->tag = entity. | Date of birth and death. Publication dates. Document create dates. Annotation dates. Email send time. XLE mentions. |
| Activity | Part of Activity's entity list. Mention in doc of Activity. | Document, person, or entity in the Activity is associated with one or more times. Tag, annotation times. Email times. XLE time relationship. |
| Entity | Co-mention in document, email, or Annotation. Manually created entity relationship. XLE relationship. | Entity used as a tag at time. Used in doc at time. Used in annotation at time. Entity is a time. |
| Time | Document, person, or entity in the Activity is associated with one or more times. Tag, annotation, email times. | Co-mention in doc, activity, tag, person<entity. Same month, season, day of week. |

Interactive Visualizations

In some embodiments, the visualization system can present an entity (e.g., an icon or certain contextual information of the search results) as a clickable item. Thus, the user can use a pointing device (e.g., a computer mouse, or a touch-screen surface) of a computing device to click on a displayed entity. Then, in response to receiving a click event, the system can update the display area of the relationship visualization (e.g., by displaying a pop-up view, or displaying a new view) to display additional contextual information associated with the clicked entity. In some embodiments, the system can obtain the additional contextual information from a context group to which the clicked entity belongs. In other embodiments, the system can perform a new relationship search through the multipartite graph, by using the clicked entity as the distal entity, to gather additional contextual information that associates the user to the clicked entity.

For example, if the user clicks on or hovers a mouse pointer over the name of a person, the system can update the display area to show a profile of this person, or the system can display contextual information for this person (e.g., display a sentence, an email message, and/or a document in which this person is mentioned). Further, the system can generate a new relationship visualization by using this person as the distal entity.

As another example, if the user clicks on a telephone number, the system can dial the telephone number, and/or show contextual information for this telephone number (e.g., display an "address book" database entry, a sentence, an email message, and/or a document in which the telephone number is mentioned). Further, the system can generate a new relationship visualization by using this telephone number as the distal entity.

As a further example, if the user clicks on an address, the system can show the address on a map and/or display contextual information for this address (e.g., display a sentence, an email message, and/or a document in which the address is mentioned). Further, the system can generate a new relationship visualization by using this address as the distal entity.

Contextual Constraints

In some embodiments, the visualization system can use a contextual constraint to determine the goals for the visualization, and the system selectively displays the smallest subset of entities that satisfies the contextual constraint. For example, the contextual constraint can indicate one or more entity types that the visualization is to display (e.g., a person's name, a phone number, and an email message). Then, the system determines which entities provide the most value by assigning scores to entities in the multipartite graph based on the contextual constraint, and displays contextual information from entities that have the highest scores and whose types match the contextual constraint.

As an example, if a user is interested in finding another person's telephone number (e.g., Jane Smith), which was sent to him in an email, the user can put the visualization in telephone number mode. The system can use the user as the proximal entity, and can use Jane Smith as the distal entity. Further, the system can create a contextual constraint indicating that the desired entity type is a telephone number. Then, the system can determine a collection of relationship paths between the user and Jane Smith, and can use the contextual constraint to select entity nodes whose information is related to a phone number. For example, the system can create multiple context groups that each includes a telephone number, and includes additional information about the context in which the telephone number was found. Further, the system can generate the relationship visualization so that the central space of the display area displays phone numbers (e.g., across multiple rows), which can display more choices for the user. In some embodiments, clicking on a telephone number can cause the relationship visualization to display information about the context in which the selected telephone number was found.

As a further example, the user may also wish to steer the visualization results temporally to view telephone numbers that have been mentioned over the last two years. Thus, the system can create the contextual constraint so that it also indicates a date range for the last two years. Then, the system can create the contextual groups so that they include entity nodes related to a telephone number, and are associated with a date range that includes the last two years.

In some embodiments, the user can adjust the date range within the relationship visualization to perform a time-focused search, for example, by adjusting a slider or entering date-range information within the relationship visualization. Thus, the user can "time travel" through information until he finds the information he is searching for. This ability to time travel through information is useful in the situation where the user has a substantial amount of information to search through. For example, if the user has more telephone numbers than can be displayed within one screen, the user can view search results pertaining to a constrained snapshot in time. Then, the user can adjust the time range to view search results for other time snapshots until the user has found the desired telephone number.

Figure 9:
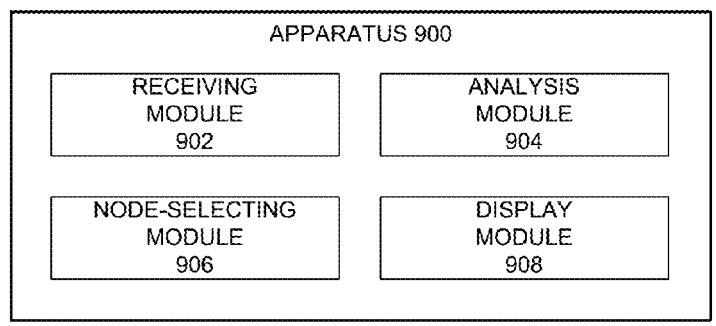
FIG. 9 illustrates an exemplary apparatus that facilitates generating a relationship visualization in accordance with an embodiment.

FIG. 9 illustrates an exemplary apparatus 900 that facilitates generating a relationship visualization in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a receiving module 902, an analysis module 904, a node-selecting module 906, and a display module 908.

In some embodiments, receiving module 902 can receive a request for a relationship visualization, such that the request indicates a user and a document. Analysis module 904 can determine, from a multipartite graph, a set of relationship paths coupling entity nodes for the user and the document. A relationship path includes one or more entity nodes indicating contextual information for a relationship between the user and the document. Node-selecting module 906 can select, from the set of relationship paths, a group of entity nodes to represent the relationship between the user and the document. Display module 908 can provide a relationship visualization, which illustrates contextual information from the group of entity nodes.

Figure 10:
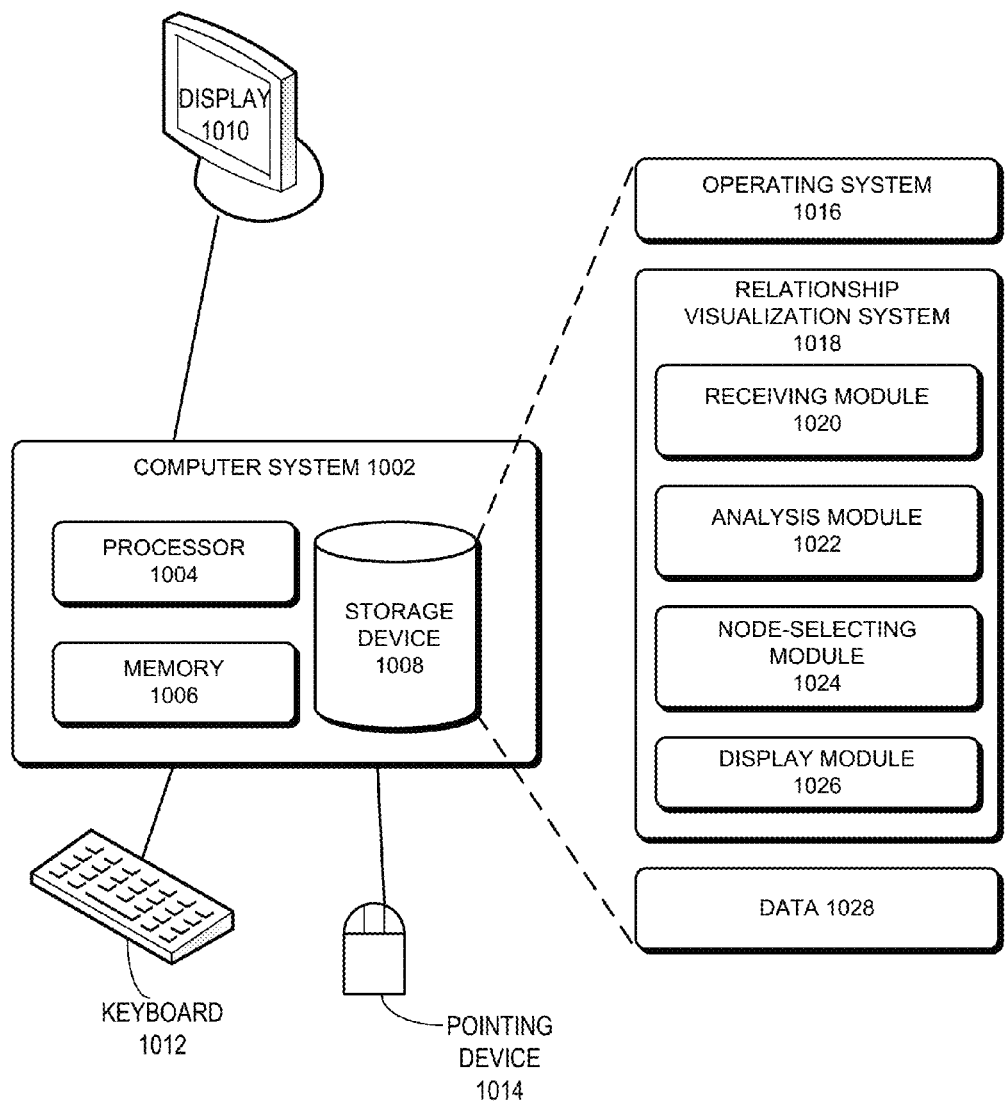
FIG. 10 illustrates an exemplary computer system that facilitates generating a relationship visualization in accordance with an embodiment.

FIG. 10 illustrates an exemplary computer system 1002 that facilitates generating a relationship visualization in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, relationship visualization system 1018, and data 1028.

Relationship visualization system 1018 can include instructions, which when executed by computer system 1002, can cause computer system 1002 to perform methods and/or processes described in this disclosure. Specifically, relationship visualization system 1018 can include instructions for receiving a request for a relationship visualization, such that the request indicates a user and a document (receiving module 1020). Further, relationship visualization system 1018 can include instructions for determining, from a multipartite graph, a set of relationship paths coupling entity nodes for the user and the document (analysis module 1022), and can include instructions for selecting, from the set of relationship paths, a group of entity nodes to represent the relationship between the user and the document (node-selecting module 1024). Relationship visualization system 1018 can also include instructions for providing a relationship visualization, which illustrates contextual information from the group of entity nodes (display module 1026).

Data 1028 can include any data that is required as input or that is generated as output by the methods and/or processes described in this disclosure. Specifically, data 1028 can store at least a multipartite graph, which includes a nonhomogeneous plurality of entity nodes and a plurality of edges between entity nodes of the multipartite graph. Data 1028 can also include a function for determining a weighted value for an entity node or an edge of the multipartite graph, and data 1028 can include weighted values for one or more entity nodes and/or edges of the multipartite graph.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
receiving, by a computing device, a first request for a relationship visualization, wherein the request includes a date range, a user, and a target entity;
selecting, from a multipartite graph, a first set of relationship paths that each includes an entity node representing the user at one end and an entity node representing the target entity at the opposite end, wherein a relationship path includes one or more internal entity nodes that represent a person, an organization, or a document;
selecting, from the first set of relationship paths, a date-range entity node whose corresponding date range overlaps with the included date range;
selecting, from the first set of relationship paths, a first group of entity nodes that form a relationship path between the user and the target entity and that traverses the selected date-range entity node;
obtaining contextual information associated with the first group of entity nodes in the first set of relationship paths; and
providing a first relationship visualization that displays the contextual information from the first group of entity nodes in the first set of relationship paths to illustrate a relationship between the user and the target entity.

2. The method of claim 1, wherein an entity node of the multipartite graph corresponds to an entity type selected from the group consisting of:
a person;
a document;
a project;
a topic;
an activity;
a date range;
a company;
an address; and
a phone number.

3. The method of claim 2, wherein providing the first relationship visualization comprises generating a date-centric relationship visualization by:
determining a visualization position for an entity node, which involves:
determining a position along a first axis for the entity node based on an entity type for the entity node; and
determining a position along a second axis for the entity node based on a date associated with the entity node; and
generating a visualization that displays contextual information for the entity node at the corresponding visualization position.

4. The method of claim 1, wherein selecting the first set of relationship paths comprises:
determining a weighted value for each entity node and each edge in the multipartite graph; and
selecting one or more shortest paths between the user's entity node and the target entity's entity node, which involves computing a path's length by:
for each edge in the path, adding an inverse of the edge's weighted value to the path's length; and
subtracting, from the path's length, a weighted value for each entity node in the path.

5. The method of claim 1, wherein selecting the group of entity nodes comprises selecting, from the relationship paths, an entity node based on a corresponding significance score.

6. The method of claim 5, further comprising determining a significance score for an entity node by:

computing an initial flow through the relationship paths from the user's entity node to the target entity's entity node;

determining a reduced flow associated with the entity node, which involves computing a flow through the relationship paths without traversing the entity node; and assigning a significance score to the entity node based on a difference between the initial flow and the reduced flow.

7. The method of claim 1, further comprising:

receiving a second request for a relationship visualization, wherein the second request indicates the target entity of a first entity type and a distal entity of a second entity type;

determining, from the multipartite graph, a second set of relationship paths coupling entity nodes for the target entity and the distal entity;

selecting, from the second set of relationship paths, a second group of entity nodes; and providing a second relationship visualization, which displays contextual information from the second group of entity nodes to illustrate the relationship between the target entity and the distal entity.

8. A non-transitory computer-readable storage medium storing instructions that when executed by a computer cause the computer to perform a method, the method comprising:

receiving a first request for a relationship visualization, wherein the request includes a date range, a user, and a target entity;

selecting, from a multipartite graph, a first set of relationship paths that each includes an entity node representing the user at one end and an entity node representing the target entity at the opposite end, wherein a relationship path includes one or more internal entity nodes that represent a person, an organization, or a document;

selecting, from the first set of relationship paths, a date-range entity node whose corresponding date range overlaps with the included date range;

selecting, from the first set of relationship paths, a first group of entity nodes that form a relationship path between the user and the target entity and that traverses the selected date-range entity node;

obtaining contextual information associated with the first group of entity nodes in the first set of relationship paths; and providing a first relationship visualization that displays the contextual information from the first group of entity nodes in the first set of relationship paths to illustrate the relationship between the user and the target entity.

9. The computer-readable storage medium of claim 8, wherein an entity node of the multipartite graph corresponds to an entity type selected from the group consisting of:

a person;
a document;
a project;
a topic;
an activity;
a date range;
a company;
an address; and
a phone number.

10. The computer-readable storage medium of claim 9, wherein providing the first relationship visualization comprises generating a date-centric relationship visualization by:

determining a visualization position for an entity node, which involves:
  determining a position along a first axis for the entity node based on an entity type for the entity node; and
  determining a position along a second axis for the entity node based on a date associated with the entity node; and generating a visualization that displays contextual information for the entity node at the corresponding visualization position.

11. The computer-readable storage medium of claim 8, wherein selecting the first set of relationship paths comprises:

determining a weighted value for each entity node and each edge in the multipartite graph; and selecting one or more shortest paths between the user's entity node and the target entity's entity node, which involves computing a path's length by:
  for each edge in the path, adding an inverse of the edge's weighted value to the path's length; and
  subtracting, from the path's length, a weighted value for each entity node in the path.

12. The computer-readable storage medium of claim 8, wherein selecting the group of entity nodes comprises selecting, from the relationship paths, an entity node based on a corresponding significance score.

13. The computer-readable storage medium of claim 12, further comprising determining a significance score for an entity node by:

computing an initial flow through the relationship paths from the user's entity node to the target entity's entity node;

determining a reduced flow associated with the entity node, which involves computing a flow through the relationship paths without traversing the entity node; and assigning a significance score to the entity node based on a difference between the initial flow and the reduced flow.

14. The computer-readable storage medium of claim 8, further comprising:

receiving a second request for a relationship visualization, wherein the second request indicates the target entity of a first entity type and a distal entity of a second entity type;

determining, from the multipartite graph, a second set of relationship paths coupling entity nodes for the target entity and the distal entity;

selecting, from the second set of relationship paths, a second group of entity nodes; and providing a second relationship visualization, which displays contextual information from the second group of entity nodes to illustrate the relationship between the target entity and the distal entity.

15. An apparatus comprising:

a processor;
a memory;
a receiving module to receive a first request for a relationship visualization, wherein the request includes a date range, a user and a target entity;
an analysis module to select, from a multipartite graph, a first set of relationship paths that each includes an entity node representing the user at one end and an entity node representing the target entity at the opposite end, wherein a relationship path includes one or more internal entity nodes that represent a person, an organization or a document;

a date-range selection module to select, from the first set of relationship paths, a date-range entity node whose corresponding date range overlaps with the included date range;

a node-selecting module to select, from the first set of relationship paths, a first group of entity nodes that form a relationship path between the user and the target entity and that traverses the selected date-range entity node;

a contextual information obtaining module to obtain contextual information associated with the first group of entity nodes in the first set of relationship paths; and a display module to provide a first relationship visualization which displays contextual information from the first group of entity nodes in the first set of relationship paths to illustrate the relationship between the user and the target entity.

16. The apparatus of claim 15, wherein an entity node of the multipartite graph corresponds to an entity type selected from the group consisting of:
   a person;
   a document;
   a project;
   a topic;
   an activity;
   a date range;
   a company;
   an address; and
   a phone number.

17. The apparatus of claim 16, wherein the display module is further configured to generate a date-centric relationship visualization by:
   determining a visualization position for an entity node, which involves:
      determining a position along a first axis for the entity node based on an entity type for the entity node; and
      determining a position along a second axis for the entity node based on a date associated with the entity node; and
   generating a visualization that displays contextual information for the entity node at the corresponding visualization position.

18. The apparatus of claim 15, wherein while selecting the first set of relationship paths, the analysis module is further configured to:
   determine a weighted value for each entity node and each edge in the multipartite graph; and
   select one or more shortest paths between the user's entity node and the target entity's entity node, which involves computing a path's length by:
      for each edge in the path, adding an inverse of the edge's weighted value to the path's length; and
      subtracting, from the path's length, a weighted value for each entity node in the path.

19. The apparatus of claim 15, wherein while selecting the group of entity nodes, the node-selecting module is further configured to select, from the relationship paths, an entity node based on a corresponding significance score.

20. The apparatus of claim 19, wherein the node-selecting module is further configured to determine a significance score for an entity node by:
   computing an initial flow through the relationship paths from the user's entity node to the target entity's entity node;
   determining a reduced flow associated with the entity node, which involves computing a flow through the relationship paths without traversing the entity node; and
   assigning a significance score to the entity node based on a difference between the initial flow and the reduced flow.

* * * * *